United States Patent [19]
Suzuki et al.

[11] Patent Number: 6,014,524

[45] Date of Patent: *Jan. 11, 2000

[54] CAMERA WITH VISUAL AXIS DETECTING DEVICE

[75] Inventors: Kenji Suzuki; Akira Ishizaki; Keiji Ohtaka; Yasuo Suda; Hidehiko Fukahori, all of Yokohama; Akihiko Nagano, Kawasaki; Kazuki Konishi, Hino; Tokuichi Tsunekawa, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/235,337

[22] Filed: Apr. 29, 1994

Related U.S. Application Data

[62] Division of application No. 08/003,954, Jan. 19, 1993, abandoned, which is a continuation of application No. 07/671,656, Mar. 19, 1991, abandoned, which is a continuation of application No. 07/327,784, Mar. 23, 1989, abandoned.

[30] Foreign Application Priority Data

| Mar. 23, 1988 | [JP] | Japan | 63-70297 |
| Apr. 28, 1988 | [JP] | Japan | 63-108808 |
| Mar. 16, 1989 | [JP] | Japan | 1-64630 |
| Apr. 26, 1989 | [JP] | Japan | 63-105298 |

[51] Int. Cl.[7] ............................. G03B 13/18; G03B 17/00
[52] U.S. Cl. .............................. 396/50; 396/51; 396/121; 396/147
[58] Field of Search ...................... 354/62, 219, 410, 354/432; 351/210, 211; 396/50, 51, 121, 147, 114

[56] References Cited

U.S. PATENT DOCUMENTS

| 3,543,666 | 12/1970 | Kazel | 354/404 |
| 3,936,849 | 2/1976 | Tsujimoto | 354/195.1 |
| 4,047,187 | 9/1977 | Mashimo et al. | 354/402 |
| 4,075,640 | 2/1978 | Ueda et al. | 354/31 |
| 4,574,314 | 3/1986 | Weinblatt | 354/400 X |

(List continued on next page.)

FOREIGN PATENT DOCUMENTS

| 61-61135 | 3/1986 | Japan . |
| 61-160824 | 7/1986 | Japan . |
| 61-172552 | 8/1986 | Japan . |
| 63-54145 | 3/1988 | Japan . |
| 63-94232 | 4/1988 | Japan . |
| 62-315490 | 6/1989 | Japan . |
| 1-190177 | 7/1989 | Japan . |

OTHER PUBLICATIONS

The Journal of the Optical Society of America, Vo. 63, No. 8, pp. 921–928 (1973).

Proceedings of the Workshop on Communication Aids for the Non–Verbal Physically Handicapped, "Development of the Eyewriter", by R.W. Wardell, pp. 148–155, Jun. 8–10, 1977.

Globecom'85 IEEE Global Telecommunications Conference, "An Eye Transducer for Keyboard Emulation", by J. Heynen and D.A. Kahn, Conference Record vol. 3 of 3, pp. 1063–1065, Dec. 2–5, 1985.

Primary Examiner—W. B. Perkey
Attorney, Agent, or Firm—Fitzpatrick, Cella, Harper & Scinto

[57] ABSTRACT

A camera comprising: finder means for inspecting an object, illumination means for illuminating an operator's eye by which the operator looks in at the finder means, a condensing optical system for condensing a reflected light from the operator's eye, photoelectric converter means for receiving the condensed reflected light, calculation means for calculating a direction of a visual axis of the operator's eye on the basis of an output of the photoelectric converter means, and condition setting means operable in response to the result of the calculation of the calculation means, for setting taking conditions of the camera.

30 Claims, 23 Drawing Sheets

U.S. PATENT DOCUMENTS

| | | | |
|---|---|---|---|
| 4,614,975 | 9/1986 | Kaite | 354/402 |
| 4,768,088 | 8/1988 | Ando | 351/210 |
| 4,774,539 | 9/1988 | Suda et al. | 396/114 |
| 4,812,869 | 3/1989 | Akashi et al. | 354/408 |
| 4,836,670 | 6/1989 | Hutchinson | 351/210 |
| 4,954,701 | 9/1990 | Suzuki et al. | 354/406 X |
| 5,036,347 | 7/1991 | Tsunekawa et al. | 354/400 |
| 5,245,371 | 9/1993 | Nagano et al. | 354/62 |
| 5,253,008 | 10/1993 | Konishi et al. | 354/402 |
| 5,327,191 | 7/1994 | Shindo et al. | 354/402 |
| 5,485,241 | 1/1996 | Irie et al. | 354/410 |
| 5,598,248 | 1/1997 | Nagano et al. | 396/51 |

CAMERA WITH VISUAL AXIS DETECTING DEVICE

This application is a division of application Ser. No. 08/003,954 filed Jan. 19, 1993, now abandoned, which is a continuation of application Ser. No. 07/671,656 filed Mar. 19, 1991, now abandoned, which is a continuation of application Ser. No. 07/327,784 filed Mar. 23, 1989, now abandoned.

BACKGROUND OF THE INVENTION

1. Field of the Invention

The present invention relates to an optical apparatus which can optically detect a direction of a gazing point (direction of a viewing axis) to control the operation of the apparatus, and, more particularly, it relates to an optical apparatus which can compensate the difference between the direction of the gazing point and a visual axis optically determined, thereby notably improving the operability of the optical apparatus camera or the like.

2. Related Background Art

Recently, the automaticity and/or intelligibility of cameras have been promoted in accordance with remarkable progress and/or cost-down of photoelectric converting devices such as an electronic circuit and CCD. For example, auto focus adjusting cameras have been widely used in not only silver chloride cameras but also video cameras, and an auto exposure adjusting function has been incorporated into almost all cameras.

These automatic functions contribute to remarkable improvement of the operability of the cameras and have a notable merits that anyone can take a photograph at a constant level without high photo taking technique.

On the other hand, however, in some cases, the picture framing operation is limited due to restrictions on the hardware of such automatic mechanisms resulting from the fact that the automatic functions are incorporated into the camera, the fundamental improvement in the cameras having such automatic functions has been requested. The most important problem is that, since both the auto focus adjusting mechanism and auto exposure adjusting mechanism are constructed to act on a central portion of a view field preponderantly, a greater part of framings of the pictures has an object positioned in the center of the picture. Particularly, since, in the focusing operation, an operator must aim at a main object correctly and it is meaningless to consider an average focus of the whole picture, it is indispensable to frame the picture so that the main object is positioned at a position where the auto focus detection device acts on the main object.

In order to avoid such restrictions on the framing of the picture, a method called as "focus lock" has been normally used. According to this method, in a half-push condition of a shutter button of a camera, when an operator set or position the main object in a central position of the field, the auto focus adjusting mechanism provided in the camera operates to focus the main object. When the main object is focused, the auto focus adjusting mechanism is automatically locked. Then, the operator shifts the main object in a desired position in the field to obtain a desired framing, while maintaining the half-push condition of the shutter button; then, the operator pushes the shutter button again to release the shutter.

A similar method can be used in the auto exposure adjusting operation, particularly in the spot photometry of a most important portion of the main object when the brightness of the object is strong, which method is called as "AE lock" and the like. Generally, the camera has the distribution of photometric sensitivity emphasized in the center of the view field; particularly in the spot photometry mode, there is the photometric sensitivity only in the central portion of the field. Accordingly, after the brightness of the most important portion of the object is measured while positioning said most important portion in the center of the field, the measured value is stored or memorized in the half-push condition of the shutter button, and then, the operator shifts the main object in a desired position in the field to obtain a desired framing.

Such methods have some fundamental drawbacks as mentioned below, so that the automatic functions as mentioned above cannot be obtained adequately:

(a) In order to shift the main object in the picture to obtain the desired framing while maintaining the half-push condition of the shutter button, it is necessary for the operator to train his finger for maintaining the half-push condition of the shutter button correctly. However, since the most persons do not take a photograph frequently, they cannot well manipulate such camera that need the skilled technique.

(b) When the object to be taken is moving toward or away from the camera, it is impossible to perform the above-mentioned automatic functions, because, even if the object is focused by the auto focus adjusting mechanism, the focused point is changed during the re-framing operation in the half-push condition of the shutter button. Further, also when the object is moving laterally of the camera in keeping a constant distance from the camera, the high skill is requested for the operator to perform the above-mentioned stepping operations (from the focusing and/or exposure to the re-framing) correctly.

(c) When the object is an animal or a person who changes his facial expression and/or pose, since the shutter chance only exists in a moment, the operator cannot obtain a desired picture through the abovementioned stepping operations.

(d) When the camera is mounted on a tripod, it will be very difficult to adjust a camera angle while maintaining the half-push condition of the shutter button.

For these reasons, a new attempt in which the framing is not limited by the central distance measuring field and/or spot photometric function has been tried. More particularly, with respect to the auto focus adjustment, there has been proposed a camera including a multi point focus detection device having a plurality of auto focus detecting points presented in a wide area of the view field, and a camera which can selectively designate a portion of a wide focus detection field and the auto focus adjusting operation is performed on the basis of an object information obtained from said portion. These cameras are both already known. For example, in the former camera, the multi point focus detection device may be comprise a plurality of conventional focus detecting elements arranged in the camera, as shown in FIG. 32. In the latter camera, the designation of the portion of the focus detection field (distance measuring field) can easily be performed through a software by the use of a microprocessor usually incorporated in the automatic focusing camera.

Explaining FIG. 32 briefly, a picture frame 441 positioned in an expected focusing plane has five distance measuring fields 442a, 442b, 442c, 442d and 442e, and a conventional focus detection system is arranged in association with each distance measuring field. For example, in FIG. 32, a bundle of light beams of a focused image passed through a rectangular view field mask opening of the leftmost distance measuring field 442a is deflected by a leftmost lens portion of a integrally formed composite field lens 443 to be sent to a pair of secondary focusing lenses $444a_1$ and $444a_2$. A stop (not shown) is arranged in front of each pair of the secondary focusing lenses. The bundle of light beams passed through the secondary focusing lens $444a_1$ is focused as a light image of the field 442a on a photoelectric converter element (referred to as merely "photoelectric element" herein-after) $445a_1$. On the other hand, the bundle of light beams passed through the secondary focusing lens $444a_2$ is focused as the light image of the field 442a on a photoelectric converter element $445a_2$. Since the above-mentioned stop (not shown) arranged near the secondary focusing lenses is focused substantially on a projecting pupil of a taking lens by means of the field lens, a so-called pupil division focus detection device is constituted by the aforementioned optical system. As shown, five focus detection devices so constituted are arranged in an array and are formed integrally with each other by structural members which can be assembled integrally.

With a hardware construction of such auto focus detection system, fundamentally, the distance measuring point can be determined by the following two methods:

(1) The operator who takes a photograph designates a distance measuring position to be focused and inputs the designation information to the camera. The switch and dial can be used as the designation information inputting means.

(2) The camera analyzes the object information regarding each of the distance measurable points, or performs the distance measuring operation to automatically determine the distance measuring point on the basis of a predetermined reference. For example, the camera can automatically focus to the nearest object among from all objects positioned in the view field.

Both of the above two methods have some problems, and thus, have not yet been accomplished as a completely available technique. More particularly, the above method (1), i.e., the method wherein the operator designates the distance measuring position for the camera has reliability; but, since it takes a long time to perform the inputting operation, the simplicity or facilitation inherent to the auto focus adjustment is lost. When the operator takes a photograph with the handy camera in a usual manner, a taking time will be shorter when the above-mentioned focus lock technique is used, than when the operator inputs the position designation information to the camera and then performs the focus adjusting operation. Accordingly, this method (1) has no merits, except when it is used in a taking operation with the camera mounted on the pripot or is used in photographing the moving object where the position designation is required.

On the other hand, in the above method (2), i.e., the method wherein the camera itself performs the auto focusing operation automatically, it is frequently difficult to obtain the desired picture framing. When the camera automatically focus to the nearest object at all times, all of the various photographing modes of the camera cannot be covered completely.

In conclusion, the above method (1) has reliability but is troublesome in operation, and the above method (2) is too uniform or standardized.

The consideration that the camera senses the visual axis of the operator to determine the distance measuring point is taught in the Japanese Patent Laid-Open No. 61-61135. However, this document does not disclose or teach the concrete method for detecting the visual axis. Incidentally, as the method for optically detecting the visual axis, a detection method using first and fourth Purkinge images reported in the literature "Accurate two-dimensional eye tracer using first and fourth Purkinge images" (Journal of the Optical Society of America, vol. 63, No. 8, page 921 (1973) and a detecting method using a first Purkinge image and a center of a pupil disclosed in the Japanese Patent Laid-Open No. 61-172552 are known.

When it is assumed that each of curved surfaces of the cornea and of the lens of an eye is a spherical surface, the visual axis of an eyeball can be determined as a connecting line extending between the centers of the cornea and of the lens of eye. However, when a person is actually looking at an object, he gazes a certain point on an extension of a connecting line (visual axis) extending between the yellow spot on the cornea and the nodal point in front eyepart. Accordingly, there is a slight difference between the visual axis of the eyeball and the actual visual axis. As a result, if the direction of the visual axis is measured and the accurate control is performed on the basis of the measured data, there will be fear of erroneous determination.

Incidentally, the method that the direction of the visual axis is detected photoelectrically to control the operation of the apparatus can be applied to the focus adjustment and/or direction adjustment in various inspection apparatuses, other than the camera having the auto focus adjusting mechanism.

Further, a recent camera includes manual input means for controlling various functions other than the auto focus adjusting function and auto exposure adjusting function, and many switches and displays for these functions are provided on the camera housing. However, an operator who does not use the camera frequently will forget the manipulation method of such switches, and thus, cannot utilize all of such functions effectively.

SUMMARY OF THE INVENTION

An object of the present invention is to permit that anyone can easily manipulate an optical devices to perform a desired operation. Another object of the present invention is to enable an accurate operation setting of a camera by detecting a direction of a visual axis correctly.

A further object of the present invention is to compensate or correct a difference between the direction of the visual axis and that of a gazing point by displaying a gazing object in a view field of an inspection system and by measuring the difference from the direction of the visual axis of the operator's eye and the direction of the gazing object.

The other object of the present invention is to determine whether an eye of the inspector which is being used to inspect the object is a left eye or a right eye.

DETAILED DESCRIPTION OF THE PREFERRED EMBODIMENTS

The present invention will now be explained in connection with embodiments thereof with reference to the accompanying drawings.

Figure 1:
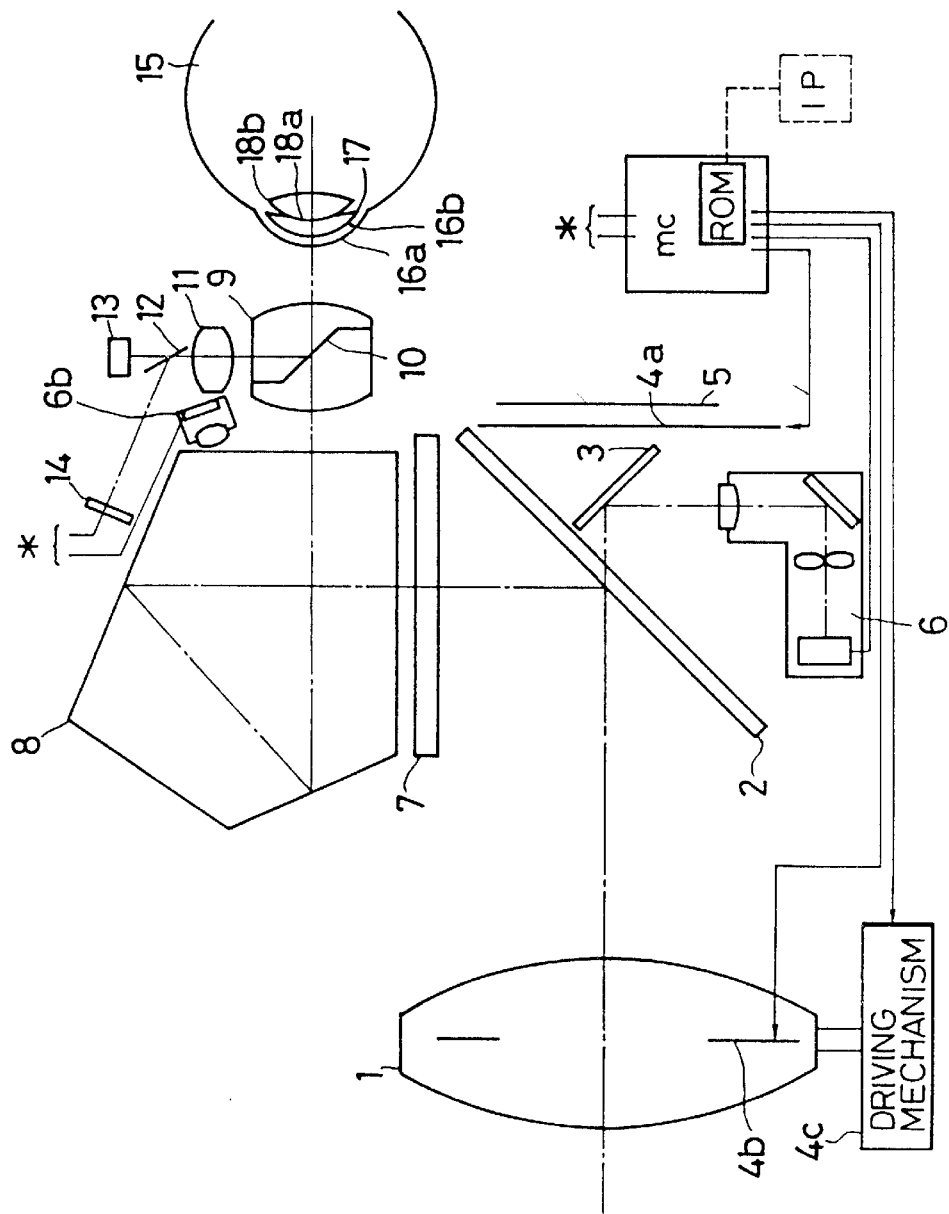
FIG. 1 is a constructural view of an optical system showing an embodiment of the present invention.

FIG. 1 shows a first embodiment of the present invention wherein the present invention is applied to a single lens reflex camera. However, it should be understood that the present invention can be applied to a camera wherein a taking light path and a finder light path are provided independently, other than the single lens reflex camera.

In FIG. 1, while an objective lens 1 is shown as a single lens for the simplicity's sake, it should be noted that, as is well known, the objective lens is actually constituted by a plurality of lenses. A main oblique mirror 2 can be shifted in a taking light path and away from the path, in accordance with a taking condition and a inspecting condition. A sub-mirror 3 can reflect a bundle of light beams passed through the main mirror 1 toward a down direction of a camera body (not shown). A shutter 4a is used to expose a light receiving surface of a photosensitive member (described later) for a predetermined time. A stop 4b is arranged in the objective lens 1, and a driving structure 4c is provided for shifting the objective lens 1 along an optical axis.

The photosensitive member 5 may comprise a silver chloride film, a solid image pickup element such as CCD, MOS and the like, or an image pickup tube such as a vidicon. If an electronic image pickup device includes an electronic shutter function, the shutter can be omitted.

Figure 2A:
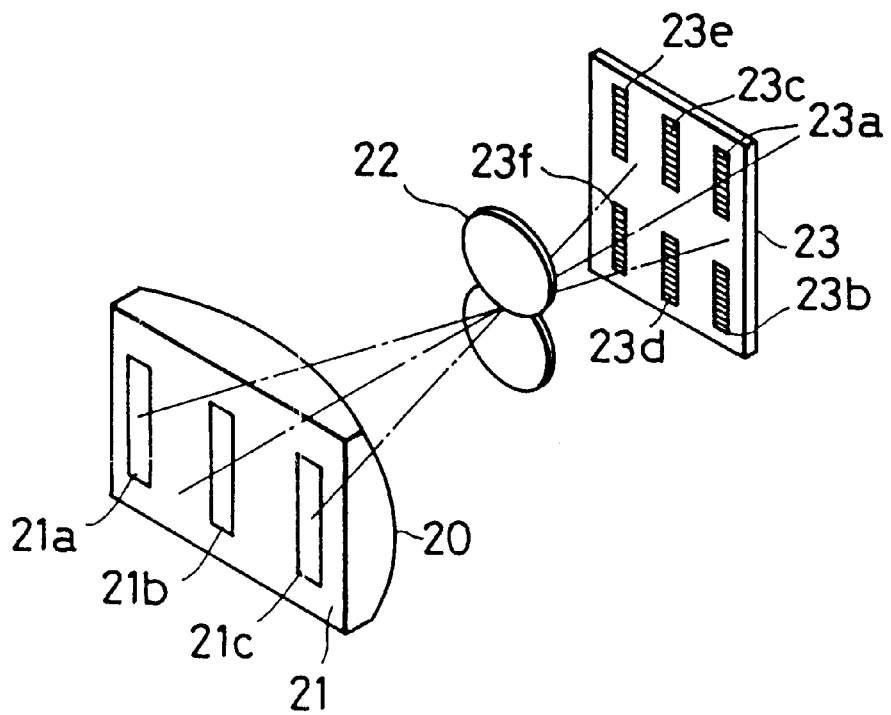
FIG. 2A is a perspective view of a portion of FIG. 1.
Figure 20:
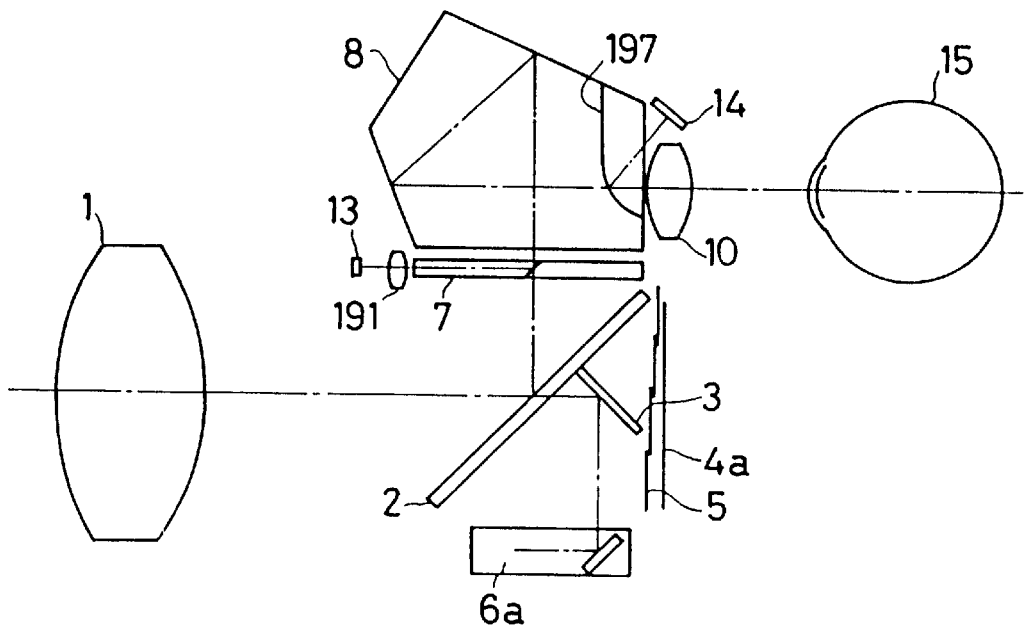

A focus detection device 6a comprises, as shown in FIG. 2A, a field lens 20, a porous view field mask 21, a secondary focusing lens 22 comprised of two lenses arranged in parallel with each other, and a light receiving device 23 comprised of a plurality of arrays of paired photoelectric elements. As shown in FIG. 1, the field lens is arranged in an expected focusing plane for the objective lens 1 near the sub-mirror 3. The detailed construction shown in FIG. 2A is described in the Japanese Patent Application No. 62-315490. Briefly explaining, slits 21a, 21b and 21c of the porous view field maks 21 determine distance measuring fields, respectively. The secondary focusing lens 22 focuses again, for example, a portion of the distance measuring field defined by the slit 21a substantially on a pair of photoelectric elements 23a and 23b. Similarly, the distance measuring fields defined by the slits 21b and 21c are focused sub-stantially on pairs of photoelectric elements 23c, 23d and 23e, 23f, respectively. Light receiving informations from the pairs of photoelectric elements are read out as electric signals, which are calculated in co-relation to each other to obtain values representing a focus adjusting condition of the objective lens with respect to an object in the distance measuring fields determined by the respective slits. Incidentally, the focus detection device may have a construction as shown in FIG. 20, or may have a construction wherein arrays of paired photoelectric elements having each having a longer length are electrically divided into each array and the light receiving informations from the respective arrays of photoelectric elements are calculated in co-relation to each other to obtain values representing a focus adjusting condition of the objective lens, as described in the Japanese Patent Application No. 61-160824.

Figure 3:
FIG. 3 is a plan view of a constructural member.

In this way, the focus detection device 6a can detect the focus conditions with respect to a plurality of positions of the phototaking field. An exposure value detection unit 6b includes a focusing lens and a light receiver which can perform a divisional photometric operation. The focusing lens conditions or provides a conjugate relation between the light receiver and a focusing plate 7 arranged in the expected focusing plane of the objective lens 1, through a light path in a pentagonal roof prism 8. A light receiving surface of the light receiver is divided, for example, as shown in FIG. 3, and each divided surface area can be photometered. An output from the light receiver is inputted to a microprocessor mp, where the weighting of the output is changed to have a distribution of photometric sensitivity having a plurality of center points.

An eye piece 9 arranged rearwardly of an exit surface of the finder light path changing pentagonal roof prism 8 is used to inspect the focusing plate 7 by means of an operator's eye 15. A Fresnel lens may be arranged in the vicinity of or integrally with the focusing plate. A light divider 10 for the visual axis detecton system is arranged in the eye piece 9 and comprises, for example, a dichroic mirror for reflecting an infrared light. The reference numeral 11 designates a condenser lens, 12 designates a light divider such as a half mirror, and 13 designates an illumination source such as LED which preferably emits the infrared light (or par-infrared light). The bundle of light beams emitted from the infrared illumination source 13 is fed, for example, as parallel light beams, along the finder light path through the medium of the condenser lens 12 and a power of the rear surface (nearer to the operator) of the eye piece 9. A photoelectric converter 14, which will be fully described later, is arranged to have a conjugate relation with the front eyepart of the oeprator's eye, more specifically, the vicinity of the pupil of the operator's eye with respect to the rear surface of the eyepiece 9 and the condenser lens 11, when the operator or inspector looks in at the eye piece 9. That is to say, the vicinity of an eye point of the finder optical system (8 and 9) and the photoelectric converter 14 are arranged in conjugate relation, and a focusing magnification is preferably one or less.

With the arrangement mentioned above, the bundle of the focusing light beams passed through the objective lens 1 is divided into a bundle of finder light beams and a bundle of focus detection light beams, by means of the partially permeable main mirror 2. The bundle of focus detection light beams passed through the main mirror 2 is reflected by the sub-mirror 3 and then sent to the focus detection device 6a. The focus detection device 6a has three focus detecting points 19L, 19C and 19R as shown in the taking plane on the focusing plate 7 of FIG. 2B When taking a photograph, the main mirror 2 is shifted upwardly, and the sub-mirror 3 is folded to be laminated or overlapped with the main mirror, and the shutter blades are opened to expose the film 5 for a predetermined time.

On the other hand, the bundle of finder light beams reflected by the main mirror 2 is passing through the focusing plate 7 and is introduced into the pentagonal roof prism 8. The bundle of light beams transmits the object image focused on the focusing plate 7 to the operator's eye 15 in an enlarged scale obtained by the eye piece 9.

Figure 4:
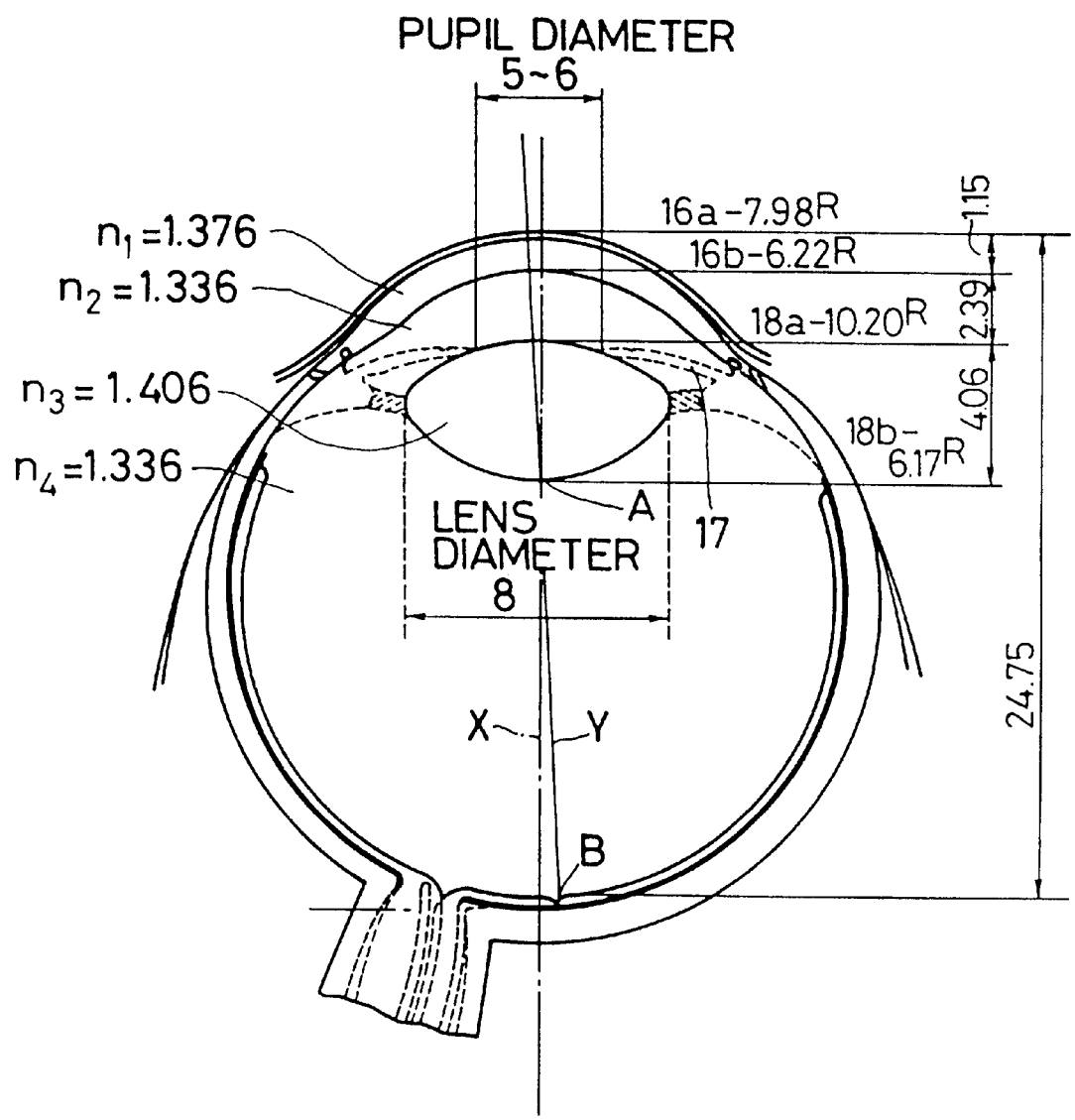
FIG. 4 is a sectional view for explaining a person's eye.
Figure 5:
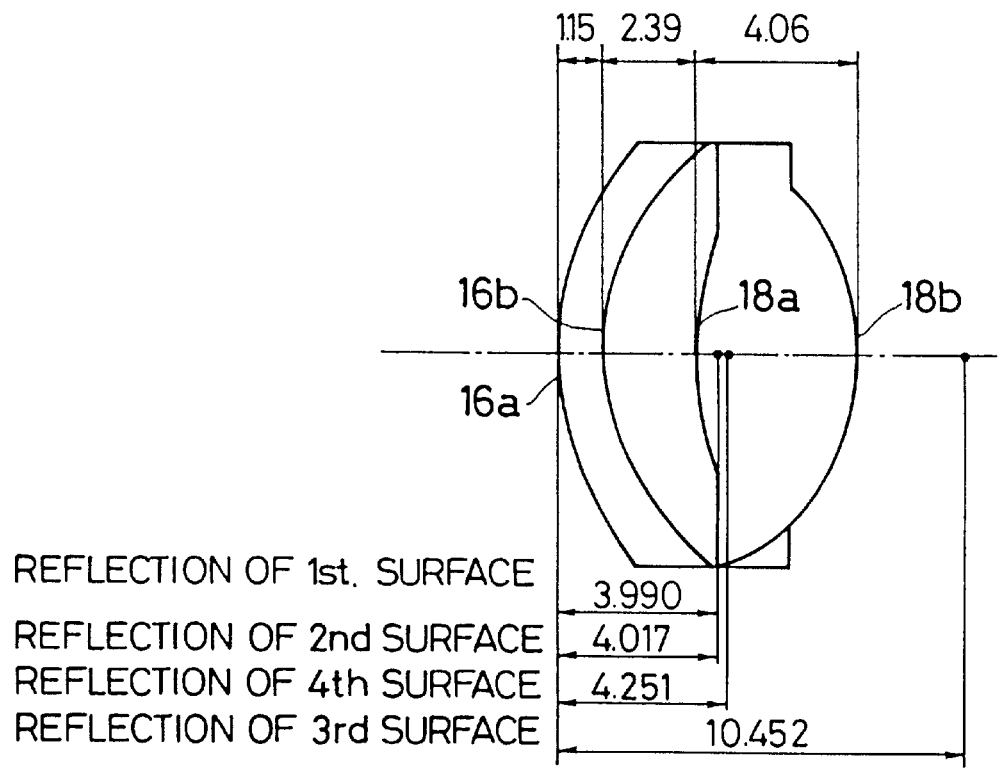
FIG. 5 is a sectional view of a model eye.

A construction of a person's eye can be regarded as a kind of abutted lens assemblys having a corneal front surface 16a, a corneal rear surface 16b, a lens front surface 18a and a lens rear surface 18b as abutting surfaces or outer surfaces, and an iris 17 is positioned in the vicinity of the lens front surface. FIG. 4 shows a standard configuration of the person's eye and indexes of refraction of various portions thereof. FIG. 5 shows an example a model eye.

In general, there is a constant difference between a direction X of the visual axis and a direction Y of hte gazing point (viewing axis). Normally, the direction Y of the gazing point coincides with a line connecting between the yellow spot B and a nodal point A in the front eyepart. When the movement of the eyeball is detected photoelectrically, it is easy to detect the visual axis X by the use of symmetry of the optical system of the eyeball. However, if the difference between the visual axis and the direction of the gazing point is not corrected, there often arises inconvenience in the case where the high accuracy is required. A method for correcting such difference will be described later.

A light path for the visual axis detection system is as follows: The illumination light emitted from the infrared illumination source 13 passes through the half-mirror 12 and is collimated in a certain extent by means of the lens 11, and then is reflected by the mirror 10 to be sent to the finder light path. In view of the brightness of the finder and the illumination efficiency of the visual axis detection system, it is desirable that the light divider 10 comprises the dichroic mirror which permits the visual finder light from the object to pass therethrough and reflects the infrared illumination light. However, if an infrared light source having adequate brightness or luminance is used as the illumination source, the light divider may comprise an ND half mirror in place of the dichroic mirror, even when the light divider is designed in consideration of the reduction of the illumination efficiency.

The infrared light introduced into the finder light path passes through the rear surface of the eye piece 9 and illuminates the operator's eye 15. It is preferable that the illumination light beams are parallel light beams upon reaching the operator's eye to maintain a substantially constant illumination condition even when the eyeball is moved. This can be achieved by adjusting the arrangement of the powers of vairous elements so that the parallel light beams are formed by the power of the lens 11 and the whole power of the rear surface of the eye piece 9. Since the indexes of the refraction at the above-mentioned surfaces have values as shown in FIG. 4, the illumination light is reflected at strengths obtained by the corneal front surface, lens front surface, lens rear surface and corneal rear surface in order, in accordance with the changes between the indexes of refraction. Further, it can be understood that the positions of the reflected images reflected by the respective surfaces are as shown in FIG. 5 when looking at from the forward of the eyeball, in consequence of the paraxial tracing. These images are called as Purkinje images, and are referred to as first, second, third and fourth Purkinje images in order from the corneal front surface toward the lens rear surface. As seen in FIG. 5, the three Purkinje images except for the third Purkinje image are concentrated in a position immediately rearwardly of the third surface, i.e., the lens front surface, and, in these images, the first Purkinje image has a stronger reflected image than that of the fourth Purkinje image which has in turn a stronger reflected image than that of the second Purkinje image. Since the illumination light for creating these images has a wavelength in the infrared area, it is not sensed by the eye, and, therefore, the illumination light does not interfere with the inspection of the finder image. To this end, it is desirable that the wavelength of the illumination light is longer than 700 nm, and, preferably is longer than 750 nm not to be sensed by all of the persons.

The reflected light reflected by the operator's eye advances along the reverse path, and therefore, passes through the mirror 10 and the lens 11 and is reflected by the half-mirror 12 to be sent to the photoelectric converter 14. It is desirable that a visual light cut and an infrared light permeable filter are arranged in a light path from the divided point (where the reflected light is separated from the finder light path) to the photoelectric converter, because the reflected light from the cornea including the finder image visual light should be cut to sent only the significant infrared illumination light for creating the light signal to the photoelectric converter. The light receiving surface of the photoelectric converter is arranged in a posiiton that the vicinity of the lens front surface of the operator's eye, i.e., the vicinity of the pupil of the eye is focused on the light receiving surface by the total power of the lens 11 and the rear surface of the eye piece 9. With this arrangement, the first, second and fourth Purkinje images are received by the photoelectric converter in the focused condition. On the other hand, since the third Purkinje image having an amount of reflected light not so weak is received by the photoelectric converter in the de-focused condition with the scattering of light, this third image does not contribute the formation of the photoelectric converting signal so much.

Figure 6A:
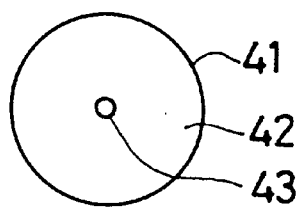
FIGS. 6A, 6B and 6C are views for showing images reflected from the eye.
Figure 6B:
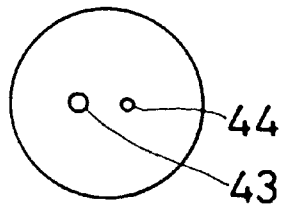
Figure 6C:
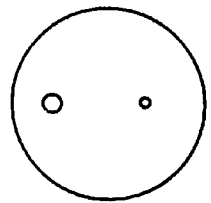
Figure 7:
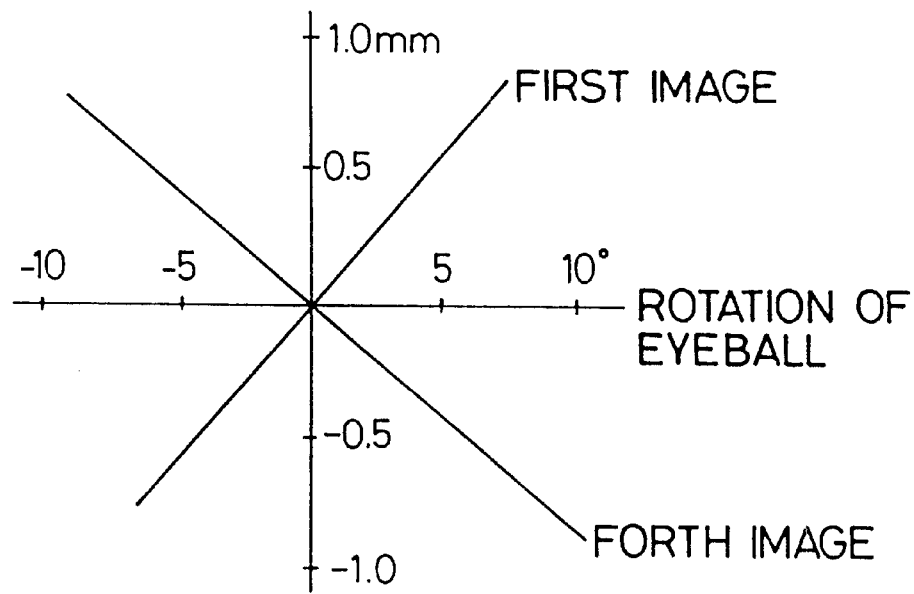
FIG. 7 is a graph showing movement of Purkinje image.

Next, a principle of the visual axis detection by means of the visual axis detection device according to this embodiment will be explained. In the system shown in FIG. 1, the position of the infrared illumination source 13 is adjusted so that it can emit a spot light from a point optically equivalent to the central point of the picture, i.e., the point corresponding to the detecting point 19C of FIG. 2B. In this case, since if an optical axis of the operator's eye passes through the center of the picture the illumination source is positioned on an extension line of the optical axis of the operator's eye, as already shown in FIG. 3, the respective Purkinje images are lined up on the optical axis of the eye as spot images. When looking at from forwardly of the eyeball, the pupil of the eyeball will be seen as shown in FIG. 6A. In FIG. 6A, the reference numeral 41 designates the yellow point, 42 designates the pupil, and 43 designates the overlapped Purkinje images. The brightly illuminated yellow point is observed as an annular form, and a single bright spot obtained by overlapping the Purkinje images of the respective reflecting surfaces is observed in the center of the dark pupil 42. On the other hand, when the visual axis is offset in either left or right direction due to the rotation of the eyeball, since the illumination light is introduced into the eyeball obliquely with respect to the visual axis thereof, each of the Purkinje images will be shifted from the center of the pupil toward an eccentric position, and, since the direction and amount of such shift of the image differs from each other regarding the respective reflecting surfaces, a plurality of Purkinje images 43, 44 and the like will be observed when looking at from forwardly of the eyeball, as shown in FIG. 6B, When the visual axis of the operator's eyeball is further offset from the center of the picture, as shown in FIG. 6C, the difference in position and amount of shift between the Purkinje images will be more remarkable. And, if the operator looks at the reverse direction, the Purkinje images will also be shifted in the reverse direction. The movement of the Purkinje images is shown in the graph of FIG. 7, where the moving amount of the first and fourth Purkinje images which are strong images in the vicinity of the pupil is illustrated as an example. By optically detecting the movement of these Purkinje images, it is possible to detect the direction of the visual axis.

In the above-mentioend visual axis detection method, it is necessary to provide the countermeasure to the parallel movement of the eyeball. Generally, the finder system of the camera is designed in such a manner that, when the operator's pupil is positioned in a certain permissible area with respect to the position of an opening of the eye piece, the operator or inspector can inspect the whole area of the view. As a matter of fact, it is well known that, if the permissible area is narrow, since the positional relation between the camera and the pupil must be maintained accurately, it will be very difficult to manipulate the camera. However, in consideration of the visual axis detection device as a reference, it means that the position of the pupil, i.e., the positions of the Purkinje images can be shifted in the permissible area, and, therefore, it is necessary to compensate such shift. While the conpensation for the shift can be carried out by various methods, the following methods can be easily realized optically:

(1) The center position of the pupil is always detected, and the relative displacement of the Purkinje image with respect to the center of the pupil is converted to a visual axis detection amount (value). This method can be carried out very easily since it is a direct method; however, according to this method, since the edge of the pupil (i.e., the border between the pupil and the iris) must be detected accurately, it is necessary to widen a cover range of the photoelectric converter element.

(2) The relative displacement between two or more Purkinje images is measured. In this method, when the combination of the first and fourth purkinje images is used, the relative displacement can be most easily detected, for the reason that the displacements of images can be measured in the same image plane since the images are formed near to each other and that the relatively stronger reflected images are obtained.

Even when either of the above methods is used, for the reason that the amount of rotation of the eyeball required to change the viewing position on the focusing plate at which the operator looks is in order of ±10°~15° at the most to displace or shift the Purkinje image in the range of about ±1 mm at the most, whereas the relative parallel movement between the eyeball and the camera can be permitted in the wider range than the former range by a few times, in some cases, the movement of the visual axis cannot be followed by a simple differential sensor. On the other hand, by measuring the distribution of amount of light near the pupil of the operator's eye by means of the arrays of the photoelectric elements constructed by integrating a plurality of photoelectric elements, and by analyzing the measured values mathematically, the visual axis detection device which does not influenced upon the position of the eyeball and/or pupil diameter can be obtained.

Figure 8A:
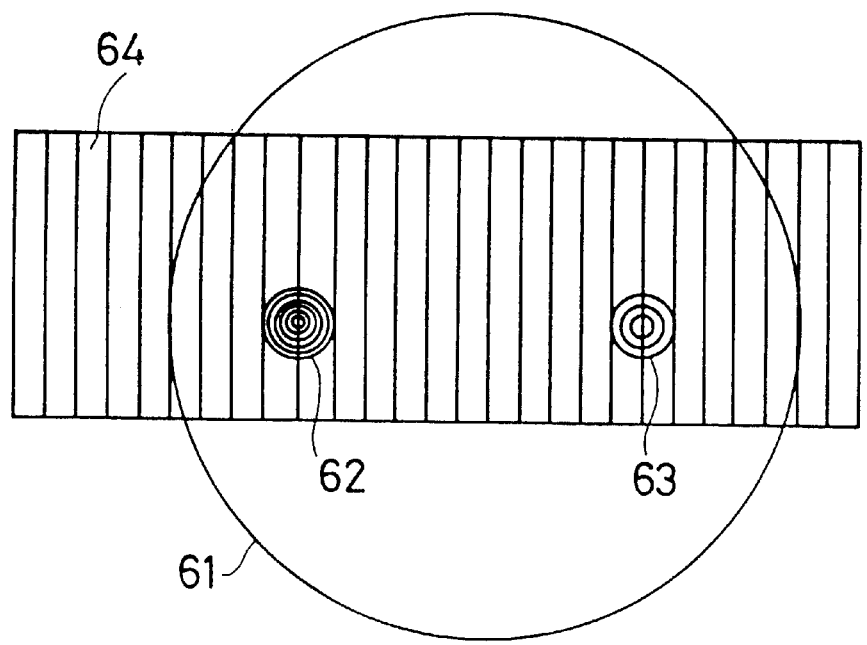
FIG. 8A is a view for explaining the reflected image.
Figure 8B:
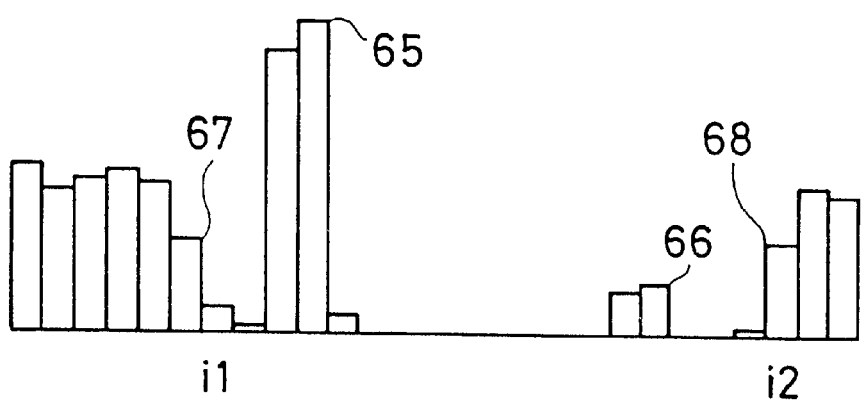
FIG. 8B is a view showing an output signal.

In the usage shown in FIG. 1, since only the transverse movement of the visual axis may be detected, a simple method using a linear array of the photoelectric elements will be explained below. FIGS. 8A and 8B are explanatory views for explaining such method. As a result of negligence of the longitudinal detection ability, the array can be constituted by a plurality of photoelectric elements each having a length longer than a width by a few times or more arranged side by side, as shown. With this arrangement, the longitudinal parallel movement and rotation of the eyeball cannot be almost detected. Similar effect can be obtained by arranging an cylindrical lens in front of the array of the photoelectric elements.

In FIG. 8A, when the linear array of photoelectric elements 64 (photoelectric converter 14) receive the first Purkinje image 62 and fourth Purkinje image 64 lightened in the pupil 61, a photoelectric output shown in FIG. 8B can be obtained. The higher values on both ends of the output represent the iris. In the dark pupil portion, signals 65 and 66 corresponding to the first and fourth Purkinje images respectively are obtained.

The center of the pupil can be obtained from the positional information of edge portions 67 and 68. Most simply, if the number of image elements for generating an output having a value near a half of an average value of the iris portion at the edge portions are denoted as $i_1$ and $i_2$ the positional coordinates of the center of the pupil are represented by the following equation:

$$i_0 = (i_1 + i_2)/2$$

Since the position of the first Purkinje image can be obtained from a maximum peak locally generated in the dark pupil portion, the rotational condition of the eyeball, and accordingly the direction of the visual axis can be obtained on the basis of the relative positional relation between the position of the first Purkinje image and the aforementioned center of the pupil, with reference to the relation shown in the graph of FIG. 7. In this case, in FIG. 7, it may be considered that the center of the pupil is an original point for the displacement of the Purkinje image. If the original point is considered to be stationary with respect to the camera, only the parallel movement of the eyeball can be obtained. The position of the fourth Purkinje image is obtained from a second peak locally generated in the dark pupil portion, and the calculation may be performed on the basis of this position and the aforementioned position of the first Purkinje image. In this case, it is not necessary to know the position of the center of the pupil. However, since the luminance of the first Purkinje image differs from that of the fourth Purkinje image by ten times or more, it is necessary to use the array of photoelectric elements each having a relatively high dynamic range.

Similar effect can be obtained by detecting the center position of the pupil with reference to an edge of an outer periphery of the cornea (portion covered by the cornea) in place of the center of the pupil. When the position of the center of the pupil is determined by the used of the outer periphery of the cornea, high accurate value can be obtained since a diameter of the outer periphery of the cornea is not changed in accordance with the external brightness, unlike to the pupil. However, in this case, since the diameter of the outer periphery of the cornea is relatively large, it is necessary to detect the wider range.

As seen in FIG. 8A, the array of photoelectric elements is not sensitive in the direction perpendicular to the direction along which the photoelectric elements are arranged. However, if the photoelectric elements each having a length too large in comparison with a width thereof are used, since there is a danger of detecting of the iris in the up-and-down direction (FIG. 8A), the length of each photoelectric element should be limited to a certain maximum limit. Accordingly, by arranging a plurality of arrays of photoelectric elements each having a relatively shorter length side by side in the up-and-down direction for detecting the visual axis to obtain the optimum output, the visual axis detection device which is not sensitive in the up-and-down direction and can always provide good Purkinje image signals can be obtained. Further, when the linear detection as mentioned above is used, further good signals can be provided by adjusting the illumination light source to generate slit light beams, in place of the spot light. In this case, a line light source may be constructed by a plurality of LED, or an infrared light permeable filter for blocking the visual light and a white light source may be arranged in order behind the slits.

The method mentioned above is performed by a microcomputer mc which receives an output of the photoelectric converter 14 of FIG. 1, and the focus detection value at the distance measuring position corresponding to the direction of the visual axis of the operator's eye is calculated by means of the microcomputer mc on the basis of the output from the focus detection device 6a, thus driving the driving structure 4c in accordance with the calculated value to focus the objective lens 1.

Figure 2B:
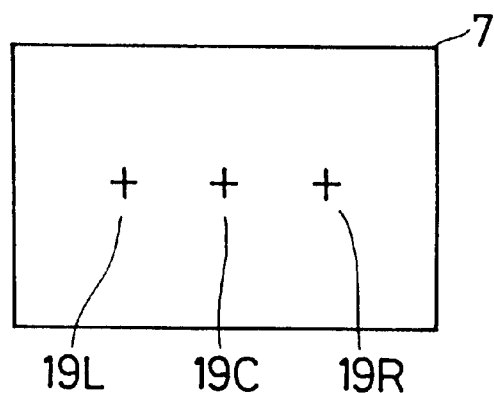
FIG. 2B is a plan view of said portion of FIG. 1.

In this way, a camera in which the visual axis for changing the distance measuring point can be controlled on the basis of the obtained information regarding the direction of the visual axis can be provided according to the present invention. It should be noted that, since the position of the visual axis is continuously obtained, the object to be controlled is not limited to the three points as shown in FIG. 2B.

Further, the output signal from the exposure detection unit 6b can be treated by the microcomputer mc to determine the exposure condition for weighting the position in response to the position of the direction of the visual axis of the operator's eye, thereby setting either or both of the shutter 4a and the stop 4b in synchronous with the operation of the release.

In addition, when the camera is manipulated, even if the plural points can be measured in both of the auto focus detecting operation and the auto exposure adjusting operation, it is possible to use either or both of them in accordance with the operator's will. Further, it is possible to display a mode display such as shutter preference, stop preference, program photography and the like in the view field of the finder, other than the focus detection and the exposure adjustment, and to take a photograph in accordance with the ascertained mode display in the first stage of the push-down of the release operation.

Next, the method for correcting the difference between the direction of the visual axis and the direction of the gazing point will be explained.

The simplest method for correcting such difference is to input a correction value or other information manually. However, in this method, the various difference values must be previously measured and the optimum difference value should be inputted. In general, average correction values regarding the person's eyes are previously stored in the microcomputer. An input device IP for inputting such correction value is shown in FIG. 1. If the correction value is previously known, that value is inputted; otherwise, the information whether the finder is looked in by the right eye or the left eye is inputted. This is performed for the reason that, since the positions of the yellow points are symmetrical regarding the left and right eyes, the direction of the difference is represented by a plus (+) or minus (−). In the eyes of almost persons, the difference between the direction of the gazing point and that of the visual axis belongs in the range of 5°–7° anatomically. Thus, if the difference is fixedly determined to 6°, it is possible to detect the difference with accuracy of±1°~2°.

Next, a detection method in consideration of individual difference will be explained. When the operator looks in at the eye piece 9, the focus detecting points 19C, 19R and 19L can be seen on the focusing plate 7. In this case, the central focus detecting point 19C is used. Before measurement, the inspector (operator of the camera) inputs a measurement starting signal from the input device IP to the camera, while gazing the focus detecting point 19C.

Then, the visual axis detection system is operated as mentioned above, thereby measuring the visual axis of the operator's eye and determining the direction of the visual axis, for example, as the amount of displacement of the first Purkinje image with respect to the center of the pupil, or as the amount of relative displacement between the first and fourth Purkinje images. In this case, since the direction of the visual axis of the person's eye is easily changed physiologically, it is preferable to utilize a signal treatment software which uses the direction of the visual axis most frequently generated for a predetermined time period.

The measured data obtained from the visual axis detection system is stored in a memory in the microcomputer mc.

Preferably, the memory comprises a non-volatile EEPROM and the like. However, the memory is not limited to such ROM, but, for example, may comprise a RAM backed-up by a battery. By providing such operation mode, it is possible to obtain the direction of the visual axis when the operator is gazing the center of the picture. When the operator performs the re-framing operation to take a photograph, the gazing point on the picture is seeked by calculating the relative difference between the measured direction of the visual axis and the viewing line when the operator is gazing the center of the picture. Expressing mathematically, for example, when the position of the first Purkinje image around the center of the pupil or around the center of the outer periphery of cornea is denoted as x, the direction X of the gazing point is represented by the following equation:

$$X = k(x - x_0) \quad (1)$$

Here, $x_0$ is the position of the first Purkinje image when the operator is gazing the center of the picture, and k is a proportional constant which is determined by a constant value of the finder system as a main component.

Furhter, in order to improve the detection accuracy, the following embodiment may be adopted.

That is to say, since, in general, there is a slight difference between the measured direction of the visual axis detected by the visual detection system and the actual direction of the gazing point of the operator, it is desirable to correct the difference if there is, and to detect again the visual axis if there is the greater difference.

Figure 9A:
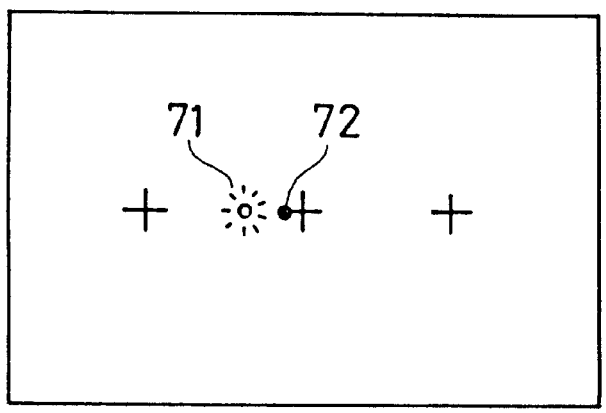
FIG. 9A is a plan view of a focusing plate.
Figure 9B:
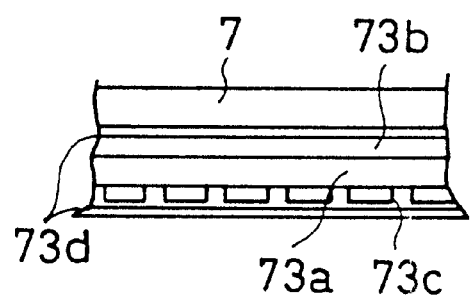
FIG. 9B is an enlarged sectional view of the focusing plate.

FIGS. 9A and 9B show the focusing plate which corresponds to the view field. The reference numeral 71 designates a display mark representing the detected result which is displayed, for example, by means of a liquid crystal display, EL display and the like laminated on the focusing plate, or an optical display for laterally illuminating a refraction grid. The value $x_0$ regarding the position is preset to an appropriate value. FIG. 9B shows a portion of the liquid crystal display. The reference numeral 73a designates a liquid crystal layer interposed between a uniform transparent electrode layer 73b and a discontinue transparent electrode layer 73c. These layers are laminated to the focusing plate 7 through a polarizing layer 73d. By selectively energizing the electrodes in the lower electrode layer 73c, display can be effected.

The operator or inspector looks in at the eye piece 9 of the finder system to inspect the display mark 71. In this case, when the operator gazes a desired object (not shown) in the inspection or view field, if the object and the display mark 71 is overlapped, it is found that the detection is correct. However, if there is a deviation between the display mark 71 and a subjective gazing point 71, it is found that the detection is incorrect (i.e., includes an error), and thus, it is desired to make adjustment or correction.

When the amount of correction is measured, while the focus detecting point was used in the aforementioned example, the display mark 71 may be used by positioning the mark in the center of the view field; in this case, when the display mark is twinkled intermittently, the inspector can easily continue his gazing condition.

Figure 10A:
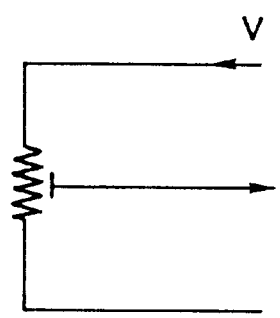
FIGS. 10A and 10B show an adjuster, respectively.
Figure 10B:
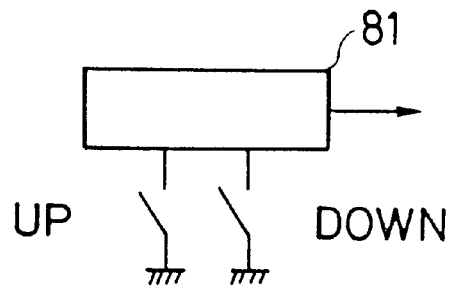

The operator changes the value of $x_0$ of the above equation (1) through the medium of the dials and switches of the input device until the position that he recognizes the gazing point and the position that is detected as the gazing point by the camera coincides with each other. When the operator recognizes that his subjective visual axis coincides with the detection display position obtained by the camera, the value of $x_0$ is fixed at that moment. The inputting operation for inputting the value $x_0$ can be effected, as shown in FIG. 10A, by mainpulating a resistance type potential divider having a constant voltage source to perform A/D conversion for providing a voltage value corresponding to the value $x_0$, or can be effected, as shown in FIG. 10B, by counting up or down the contents of a resister 81 storing the value $x_0$ therein. With the above-mentioned method, while the provision of the display is required, it is convenient for the reason that during the measurement the operator do not always keep his gazing point onto the reference point.

In order to detect the gazing point with high accuracy, the present invention is directed to correct the deviation between the direction of the visual axis and the direction of the gazing point. When the operator is changed to another person, since the amount of the aforementioned deviation (difference) is also changed delicately, the above-mentioned gazing point display technique is effective to provide foolproof condition.

When the gazing point display mark provided on the picture field of the camera coincides with the operator's subjective gazing point, the camera may be used as it is; on the other hand, for example, by changing perspons, when the gazing point display mark does not coinicide with a new operator's subjective gazing point, the above-mentioned correction operation may be carried out again. If the gazing point display mark appears during the visual axis detecting operation, the operator can judge instantaneously whether the correction should be effected or not, and does not forget the necessity of the correction.

As mentioned above, when there is no need to use the severe or critical position of the gazing point, the deviation (difference) between the direction of the visual axis and the direction of the gazing point can be determined as a universal constant value regardless of the individual difference, and is stored in a mask ROM in the circuit. Also, in this case, of course, the inputted gazing point can be displayed to confirm the position thereof.

With the above-mentioned method, for example, the auto focus adjusting operation can be performed with respect to one of the three focus detecting points 19L, 19C, 19R and the auto exposure adjusting operation (described later) can also be performed, on the basis of the information regarding the position of the operator's gazing point. Since the detection of the gazing point by means of the above method can detect the position continuously or intermittently at a very short pitch or interval, it is apparent that the moving object is not limited to the three points as shown in FIG. 1.

Figure 11:
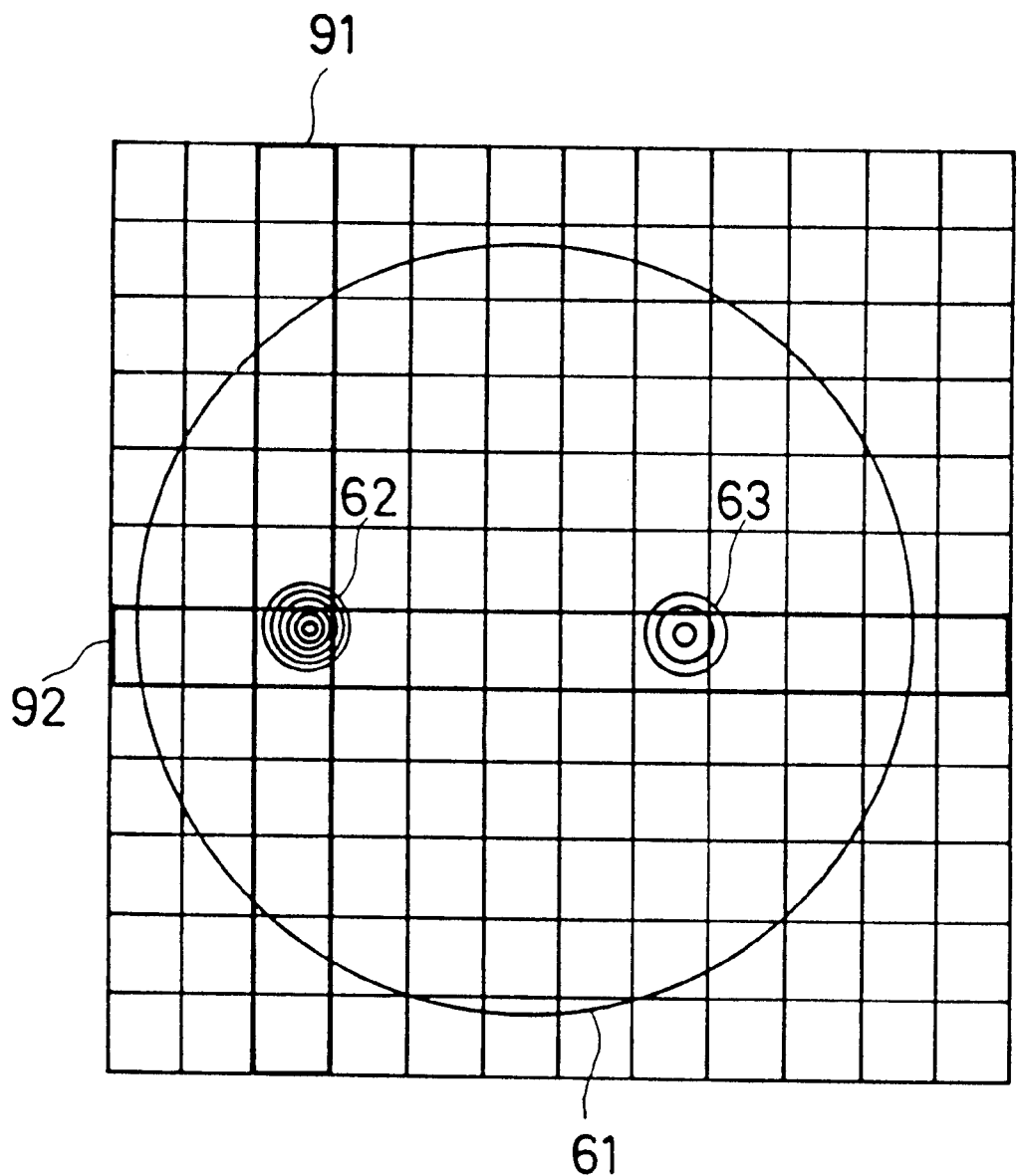
FIG. 11 is a view for explaining two-dimentional detection of the reflected image.

While the visual axis detection operation was explained in connection with the linear direction, when it is desired to detect the movement of the visual axis in two directions perpendicular to each other, the arrays of the photoelectric elements comprising of the picture elements each having substantially square configuration and arranged in two-dimensional directions. By selecting the linear arrangement including the first Purkinje image both in longitudinal and transverse directions, by the use of the aforementioned method for detecting the visual axis on the basis of the center of the pupil, the position of the visual axis in the two orthogonal directions can be obtained. That is to say, as shown in FIG. 11, the light image of the vicinity of the pupil of the operator's eye is focused on the arrays of photoelectric elements arranged along the two-dimensional directions. In this case, the signals from a longitudinal linear arrangement 91 of the photoelectric elements and a transverse linear arrangement 92 of the photoelectric elements are to be used. The arrays of the photoelectric elements may comprise conventional CCD image pickup elements or MOS image pickup elements. Further, the selection of the longitudinal and transverse linear arrangements of the photoelectric elements including the first Purkinje image at their crossing position can easily be carried out by the microcomputer.

Also in this embodiment of the present invention, the method for correcting the deviation between the position of the visual axis and the position of the gazing point is essentially the same as that of the previous embodiment. That is to say, most simply, an average value of the anatomical data regarding the persons' eyes is used, and the correction value for correcting the deviation is previously stored. And, the detected direction of the visual axis is corrected on the basis of the stored information. When the direction of the gazing point is denoted as X, the following equations are obtained:

$$X = k(x - x_0) \tag{2a}$$

$$Y = k(y - y_0) \tag{2b}$$

Here, (x, y) is the position of the first Purkinje image around the center of the pupil or the center of the outer periphery of the cornea, and $(x_0, y_0)$ corresponds to (x, y) when the operator gazes the center of the picture.

In order to perform a more precise detection of the gazing point, the above correction value $(x_0, y_0)$ is detected per person. In this case, the aforementioned method for detecting the gazing point when the operator gazes the center of the picture, or the aforementioned method for adjusting the correction value so that the operator's subjective gazing point coincides with the gazing point display mark can be used.

Figure 12:
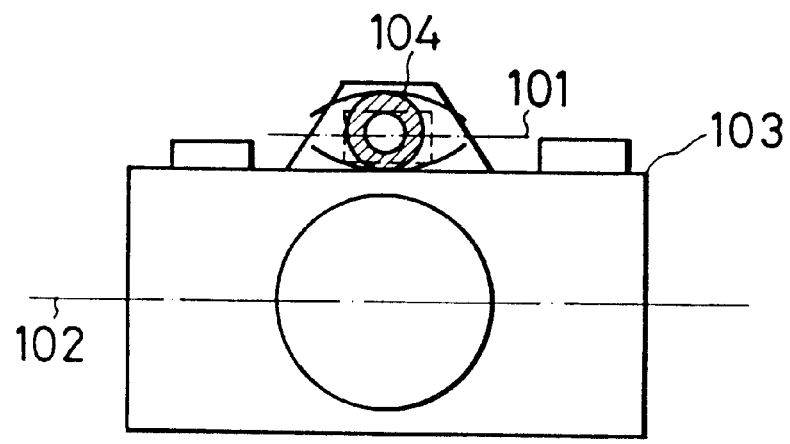
FIGS. 12 and 13 are views for explaining the change in a poisture of the camera.
Figure 13:
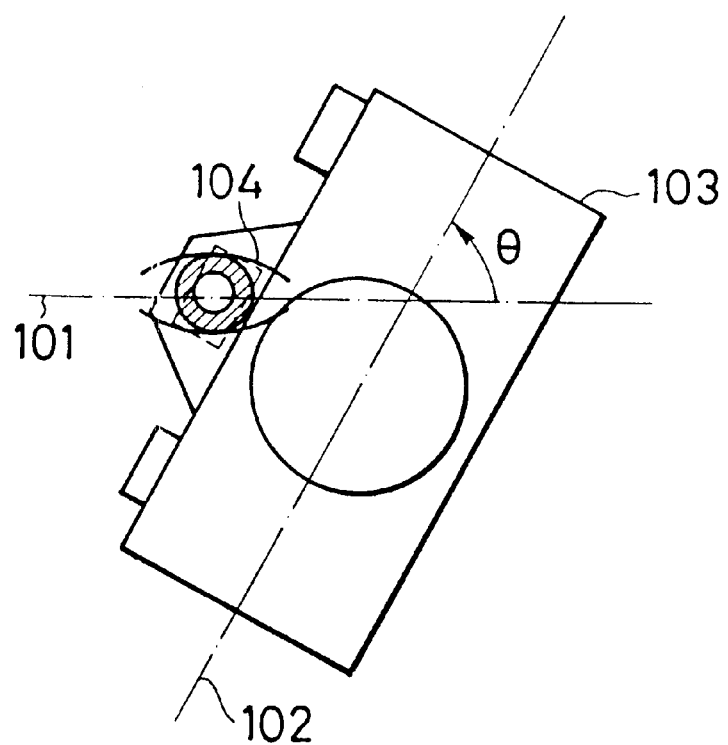

In the explanations mentioned above, it was assumed that the camera was stationary. In order to assure the operation of the visual axis detection device in more general conditions, it is desirable to detect an amount of relative rotation between the eyeball and the camera around the visual axis of the operator's eye. The most standard condition for providing the freedom of such relative rotation can be obtained when a horizontal line 101 of the operator's eye is parallel to a horizontal line 102 of the camera, as shown in FIG. 12; however, actually, there often arises a condition that the horizontal line 101 is not parallel to the horizontal line 102, as shown in FIG. 13, according to the operator's demand. Typically, in the most cases other than the condition of FIG. 12, an angle θ between the lines 101 and 192 will be ±90°. In FIGS. 12 and 13, the reference numeral 103 designates a single lens reflex camera using a pentagonal roof prism, and 104 designates the operator's eye inspecting the picture field from the finder window positioned behind the pentagonal roof prism. When the camera is rotated with respect to the operator's eye as shown in FIG. 13, the correction value $(x_0, y_0)$ for the gazing point must be amended as follows:

$$\begin{pmatrix} \overline{x_0} \\ \overline{y_0} \end{pmatrix} = \begin{pmatrix} \cos\theta & -\sin\theta \\ \sin\theta & -\cos\theta \end{pmatrix} \begin{pmatrix} x_0 \\ y_0 \end{pmatrix} \quad (3)$$

From the above equation (3), the correction value $(\overline{x}_0, \overline{y}_0)$ is calculated according to the amount θ of rotation, and the gazing point of the operator's eye is sought from the above equations (2a) and (2b) on the basis of the measured value regarding the visual axis.

Figure 14:
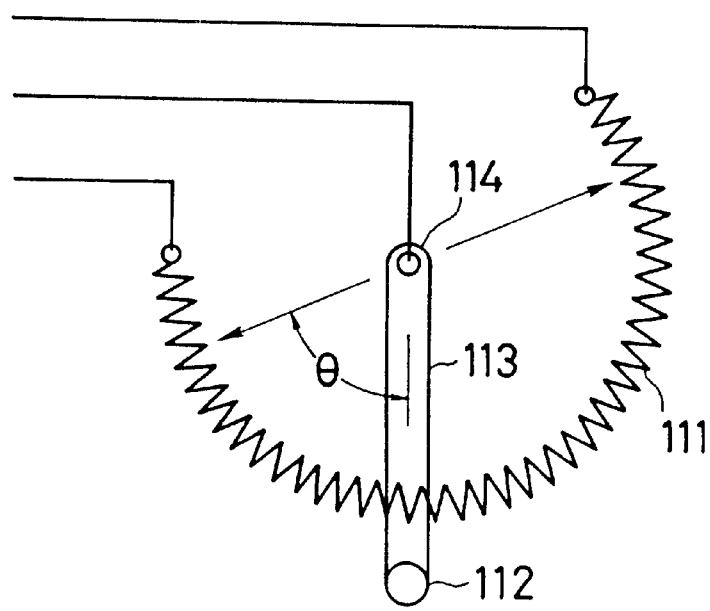
FIGS. 14 and 15 are views for showing a detector, respectively.

In order to measure the amount θ of rotation, a photoelectric method may generally be used. For example, by measuring the position of a portion of the eye such as the corner of the eye with respect to the reference coordinates of the camera, the horizontal line 101 of the operator's eye can be relatively obtained. However, in almost all cases, since during the framing operation the operator's eye is substantially stationary and the posture of the camera is changed, the measurement of the amount θ of rotation can be replaced by the measurement of the inclination of the camera with respect to the universal horizontal line of the earth. To this end, as shown in FIG. 14, a detector comprising a slider 113 having a weight 112 at its lower end and revokable around a pivot 114, and a variable resister 111 may be used. In this case, by the use of the feature that the slider 113 extends along the vertical direction due to the presence of the weight 112, the angle θ between the slider and a reference line of the variable resister are measured to determine the inclination of the camera. Incidentally, the pivot 114 acts also as an output terminal for outputting the divided voltage.

Figure 15:
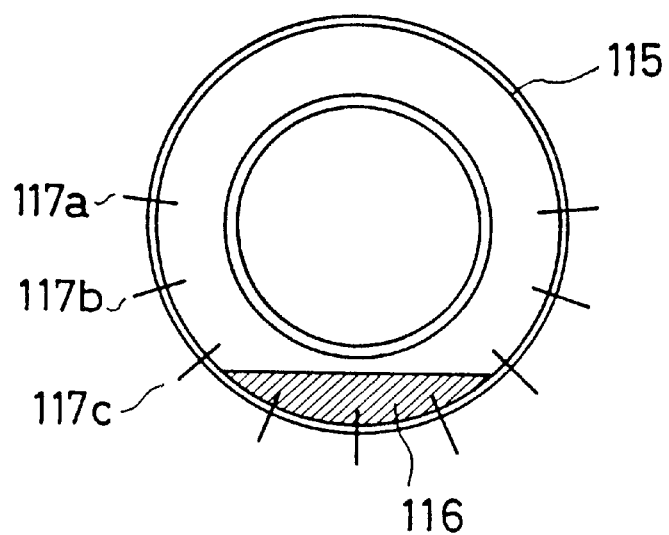

Alternatively, a detector comprising a mercury switch 115 constituted by an annular ring and mercury 116 sealingly received in the annular ring, as shown in FIG. 14, may be used. In this case, by detecting the electrical connection between electrical contacts 117a, 117b, 117c and the like, the amount of rotation of the annular ring 115 can be determined. By incorporating the detector for detecting the inclination as shown in FIG. 14 or FIG. 15 into the camera, since the inclination of the camera can be measured, and, therefore, the correction of the position of the visual axis can be effected by the use of the equation (3) on the basis of the measured rotation θ, thus obtaining the accurate position of the gazing point.

In the visual axis detection system according to this embodiment, it is desirable to reduce the focusing magnification, i.e., the magnification when the inspected surface near the pupil is focused on the light receiving surfaces of the photoelectric elements. As mentioned above, the finder system of the single lens reflex camera is designed to have a permissible width with respect to the position of the pupil of the operator's eye. Generally, the camera is designed in such a manner that the position of the pupil can be shifted in the field by about 10–20 mm. Since the camera is usually used outdoors with being kept by the operator's hand, if the above-mentioned value is reduced, the operability of the camera will be widely reduced. The above permissible width corresponds to the minimum spatial range to be detected by the visual axis detection device. As is well known, a silicone photoelectric element such as CCD, MOS and the like will be remarkably expensive and is reduced in its uniformity of sensitivity as the active area thereof is increased. However, according to this embodiment of the present invention, since the amount of displacement of the position of the first Purkinje image corresponding to the rotation of the eyeball is in the order of 1 mm, even when the optical detection system is constituted by the reduced optical system, the displacement of the Purkinje image and the pupil can be detected with adequate resolving power. Further, even if the position is detected merely at a unit of picture element with the simple signal treatment, it is well possible to integrate the picture elements at a pitch of 10 μm. Accordingly, by performing interpolating calculation by means of an appropriate software, it is possible to detect the displacement with accuracy of ±1 μm, by the use of the picture elements having the pitch of 10 μm. Preferably, the reduced magnification is about 2–10 times. In addition, by using the reduced optical system, since the volume of the detection system is decreased, the portable camera can be further compacted.

In the design of the visual axis detection optical system according to this embodiment of the present invention, another hint or noticed point is that a positive power lens should be arranged in the vicinity of the corneal surface as near as possible. Since the curvature of radius of the corneal surface is about 8 mm at most, a focal length as a convex lens is merely 4 mm. When the parallel illumination light beams is reflected by the corneal surface, the reflected light beams will be quickly scattered in reverse proportion to a square of the distance. Accordingly, if the distance up to the lens having the main positive power of the detection optical system is long, the efficiency of the available amount of light will be remarkably reduced, thus making the detection of the visual axis difficult. Although this can drawback can be amended in a certain extent by utilizing the stronger light source and/or the photoelectric element having high S/N ratio, it is advantageous to separate the reflected infrared light from the finder light path before the reflected light is scattered and to direct the separated light to the lens. Therefore, it is desirable to arrange the optical separating member in or near the last lens of the finder optical system.

Figure 16A:
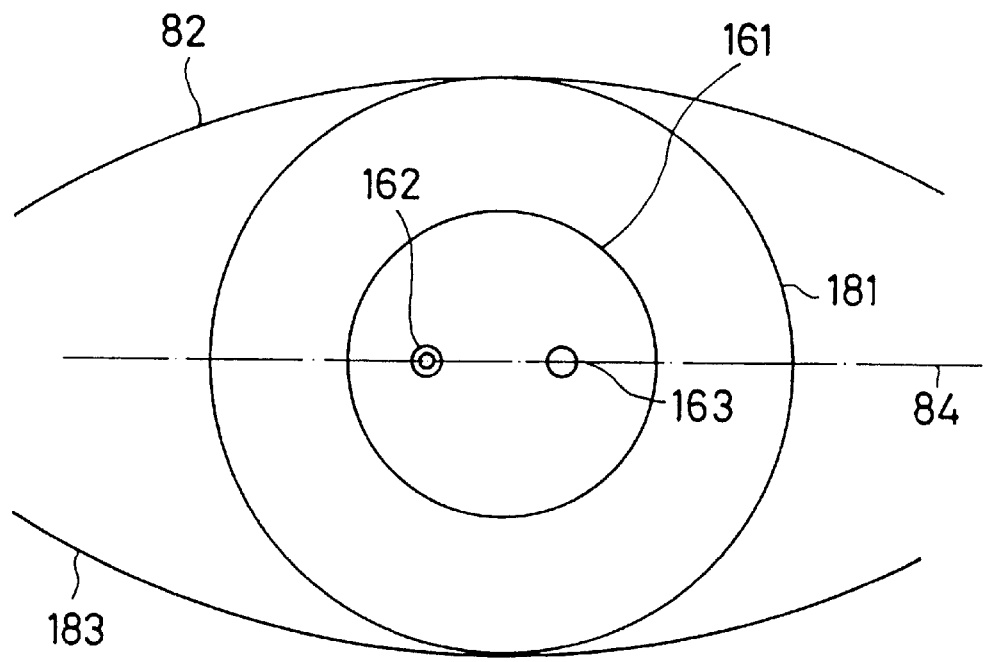
FIG. 16A is a view for explaining the reflected image.
Figure 16B:
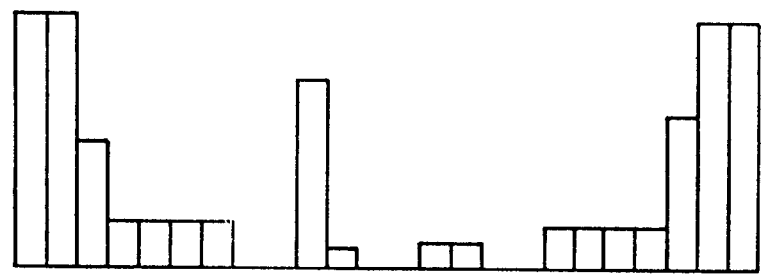
FIG. 16B is a view showing an output signal.

On the other hand, in the illustrated embodiment, in place of the measurement of the center of the pupil, it is preferable to measure the border between a white of the eye and the outer periphery of the cornea to seek the center position of the outer periphery of the cornea which is used as a original point for the coordinates of the Purkinje images, because the diameter of the pupil will change in accordance with the external brightness and/or a mental state of the operator, thus loosing the roundness thereof. The border between the white of the eye and the outer periphery of the cornea shows the change in index of reflection which can be very easily detected. FIG. 16A shows the positional relation between the light image of the front eyepart of the operator's eye and the linear array of photoelectric elements for detecting the visual axis, and FIG. 16B shows an example of output signals from the array of photoelectric elements. With this method, the detection can be effected with high accuracy, but since the illumination area and the detection area of the photoelectric element will be wider, the detection system becomes expensive. In FIG. 16A, the iris surrounds the dark portion 161 of the pupil including the first Purkinje image 162 and the fourth Purkinje image 163, and the outer periphery of cornea is contacted with the white of the eye along the border 181. The reference numeral 182 designates an upper eyelid, and 813 designates a lower eyelid. FIG. 16B shows the output obtained when the photoelectric conversion is effected along a measuring line 184.

Figure 17:
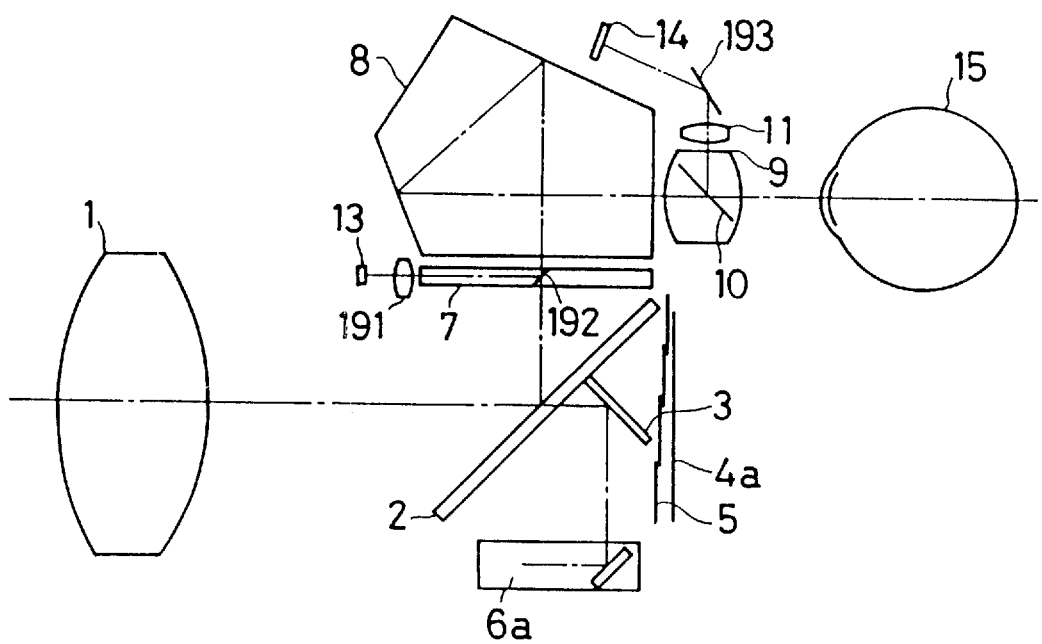
FIGS. 17 to 21 are constructural views of an optical system showing other embodiments of the present invention, respectively.

FIG. 17 shows an optical layout according to a further embodiment of the present invention, wherein an example that the infrared illumination optical system and the detection optical system are arranged independently is shown. In the drawing, the same elements as those shown in FIG. 1 are designated by the same reference numerals. The infrared light beams emitted from the infrared illumination source 13 such as ILED are condensed by a lens 191 and then passes through the focusing plate 7 and is focused in the vicinity of a dichroic mirror or half-mirror 102, and is reflected by this mirror to be introduced into the finder light path. The illumination light beams discharged from the pentagonal roof prism 8 is collimated by the eyepiece 9 and then is sent to the operator's eye 15.

Figure 18:
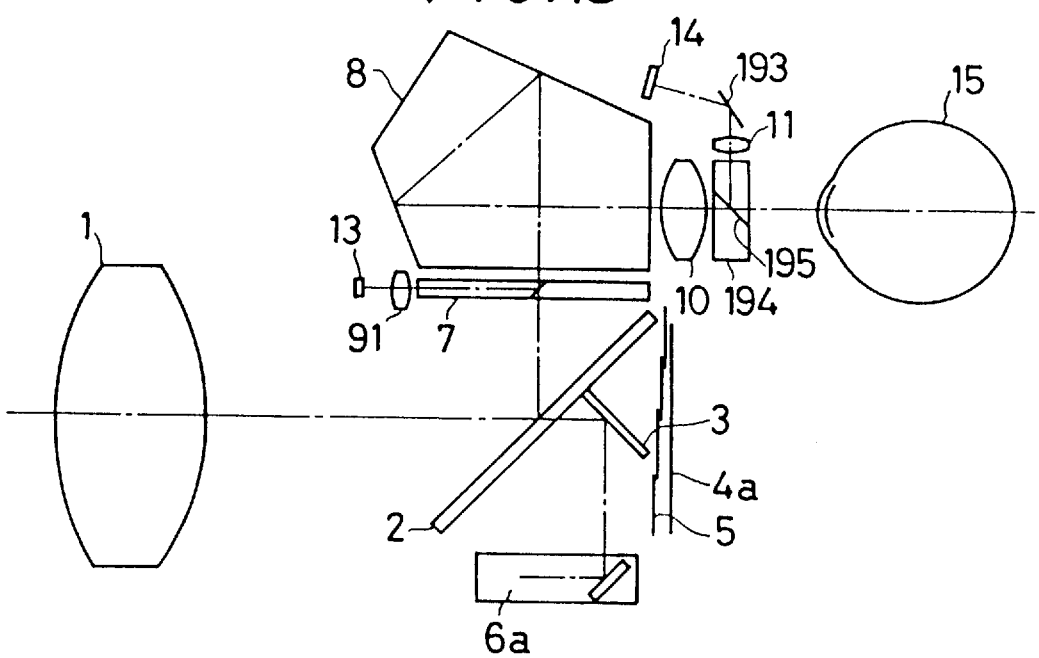
Figure 19:
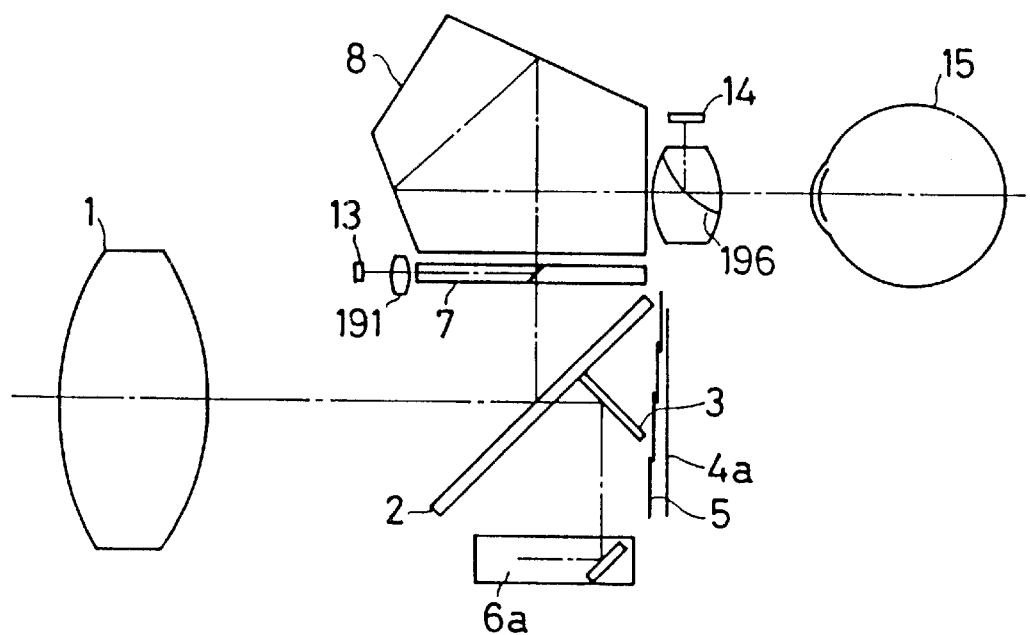
Figure 21:
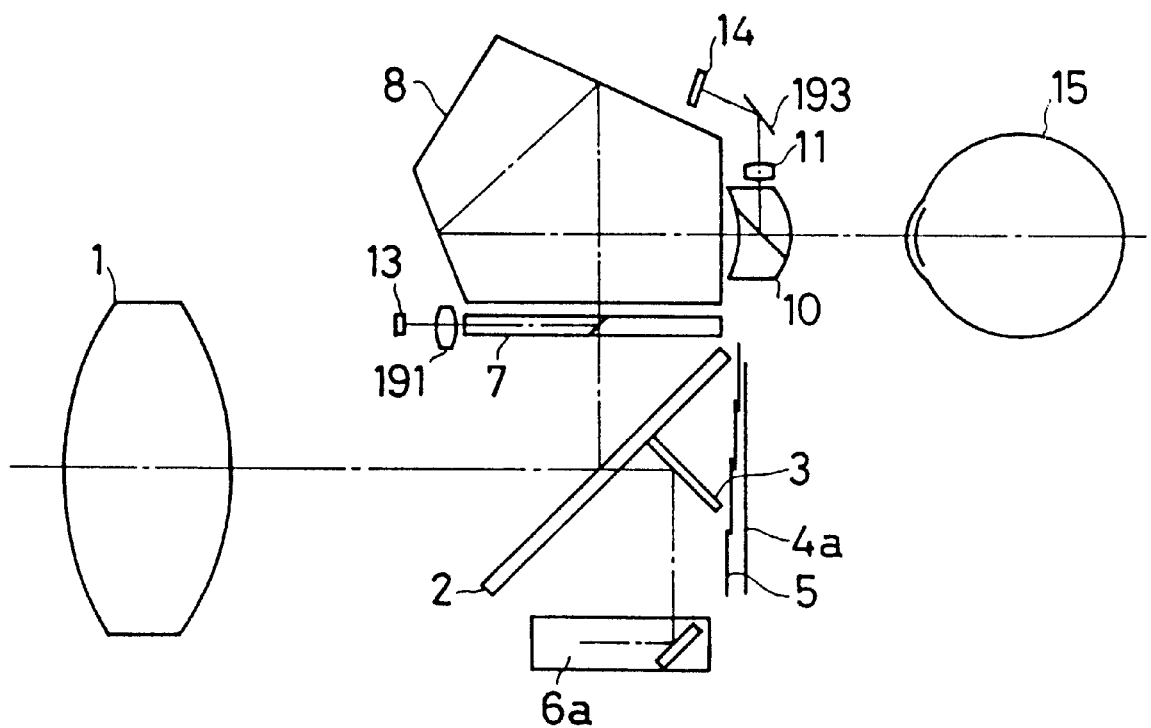

The detection system according to this embodiment has the same construction as that of FIG. 1, except that a mirror 193 is a total reflection mirror. FIG. 18 shows an example that an optical member 194 is provided independently from the eyepiece 9 for using as a light divider, by which the light is separated from the finder light path to reach the converter 14 through a dichroic mirror or half-mirror 195. With this optical arrangement, it is easy to approach the position of the optical separating member, and accordingly, the position of the condenser lens 11 toward the corneal surface of the operator's eye and to obtain the adequate amount of light of the reflected light beams. In this case, it should be noted that the refraction force of the condenser lens is stronger than that of FIG. 1. FIG. 19 shows an example that the optical separating member for separating the reflected light reflected by the front eyepart has a curved surface 196. A dichroic mirror or half-mirror is formed on the abutted surface. According to this example, the length of the light path of the detection optical system can be shortened, and the reflected light from the front eyepart can be effectively introduced into the light receiving surfaces of the converter 14. FIG. 20 shows an example that the optical separating member is arranged in the pentagonal roof prism, and a dichroic mirror is formed on the abutted surface as similar to the former example. FIG. 21 shows an example that the eyepiece is constituted by a meniscus convex lens, and by arranging the positive power surface thereof in confronting relation to the operator's eye, the condensing force for condensing the reflected light reflected by the front eyepart and scattered from the corneal surface is increased.

Figure 22A:
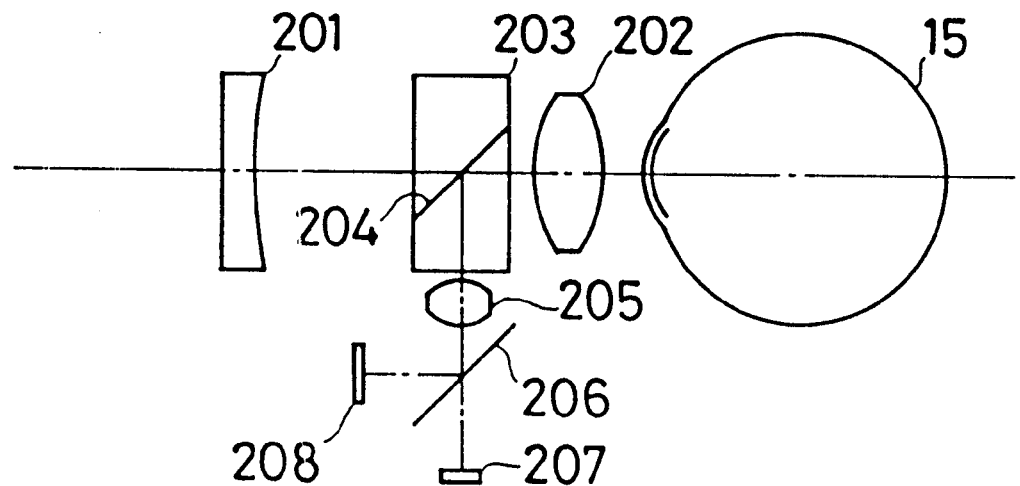
FIGS. 22A and 22B are constructural views of an optical system showing further embodiments of the present invention, respectively.
Figure 22B:
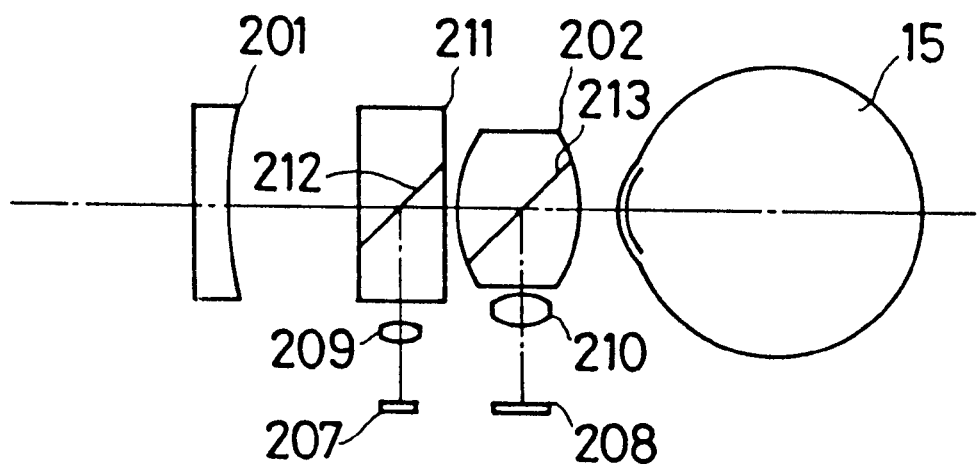

It should be noted that the present invention is not limited to the single lens reflex camera. FIG. 22A shows an example that the present invention is applied to an inverted Galilean finder system. The finder optical system is essentially constituted by a concave lens 201 and a convex lens 202 and is an afocal system having a angular magnification of 1 or less. In the embodiment shown in FIG. 22A, a parallel plate-shaped optical member 203 is arranged between the positive lens and the negative lens, and a dichroic mirror or half-mirror 204 optically connects the finder optical system and the visual axis detection optical system. The positive lens 205 acts to collimate the light beams emitted from the infrared illumination source 207 and to focus the reflected light from the front eyepart onto the light receiving surfaces of the array 208 of photoelectric elements. The reference numeral 206 designates a half-mirror. The method for detecting the visual axis is substantially the same as that of the embodiment shown in FIG. 1. FIG. 22B shows an example that the infrared illumination source and the detection optical system are arranged separately. A dichroic mirror 212 of the light divider 211 reflects the bundle of the light beams emitted from the infrared illumination source 207, and a half-mirror of the eyepiece 202 reflects the reflected light from the eye.

Figure 23:
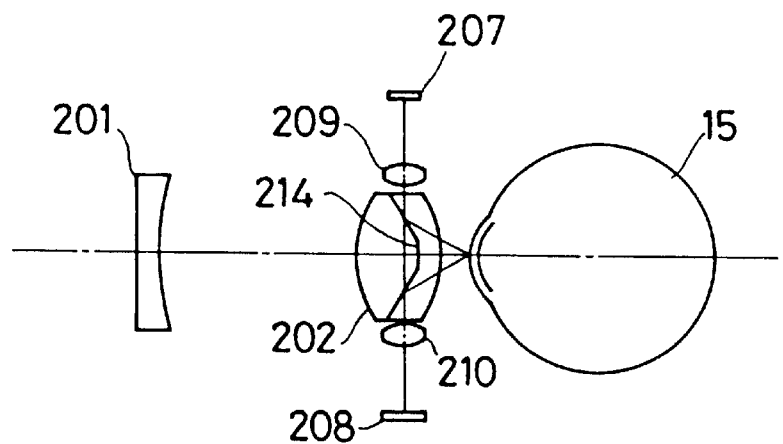
FIGS. 23 and 24 are constructural views of an optical system showing further embodiments of the present invention, respectively.

According to the present invention, it is not necessary to send the infrared illumination light to the operator's eye along the optical axis. As shown in FIG. 23, the light from the infrared illumination source 207 may be introduced obliquely with respect to the optical axis and visual axis, by means of a dichroic mirror or half-mirror 214. In this case, even when the visual axis is directed to the center of the picture field, the Purkinje image does not coincide with the center of the pupil or the center of the outer periphery of the cornea, and the Purkinje images on the respective surfaces are observed separately. However, if the displacement condition of the Purkinje images when the operator gazes the center of the picture field is previously measured and the displacement condition is previously set as an initial condition, since the deviation from the initial condition may be merely detected in the actual visual axis detecting operation, it is possible to perform the correct operation by using the correction operation, if necessary. This feature is not inherent to the inverted Galilean finder system, but is a general principle, and thus, is obtained in the single lens reflex camera described above.

Figure 24:
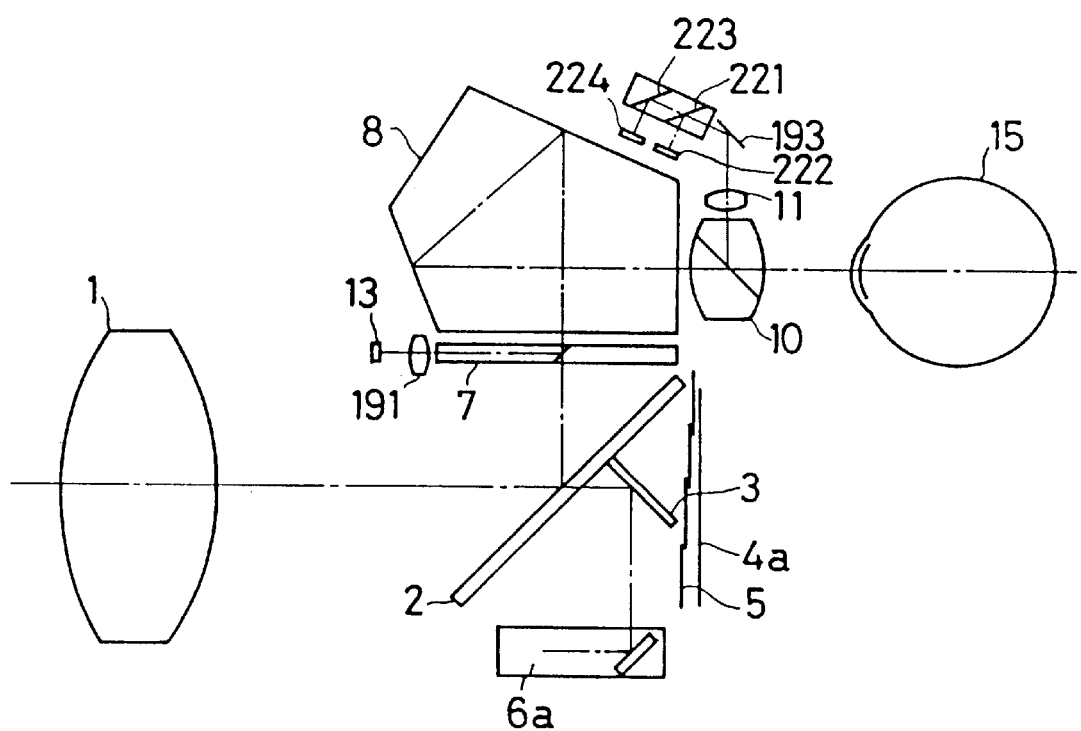

Further, in the present invention, by providing two or more photoelectric surfaces, it is possible to detect the reflected image of the operator's eye at different positions spaced apart along the direction of the visual axis. For example, in the aforementioned FIG. 5, the third Purkinje image is formed near the center of the eye. Since this image is more largely shifted than the first and fourth Purkinje images when the eyeball is rotated, for the fact that the curvature of radius of the third surface on which the third image is formed is relatively large and the third surface has a long focal length as a reflection mirror, this third image can be used to detect the visual axis with high accuracy. FIG. 24 shows an alternation of a visual axis detection device of FIG. 17, for measuring both the vicinity of the pupil of the operator's eye and the third Purkinje image. With this arrangement, the reflected light reflected from the operator's eye and focused by the lens 11 is separated into two by a half-mirror 221 and a mirror 223 to be received onto two arrays 222, 224 of photoelectric elements. The array 224 of photoelectric elements observes the front eyepart near the pupil, whereas the array 222 of photoelectric elements observes the more deep portion of the eye. The visual axis can be sought on the basis of, for example, the output of the center of the pupil and the output of the third Purkinje image among the outputs of the arrays 222, 224.

The usage of the camera having the visual axis detection device is not limited to the control of the auto focus adjustment, but the present invention can be used as the input means for controlling the usual operations of the camera, as mentioned hereinbefore.

Figure 25A:
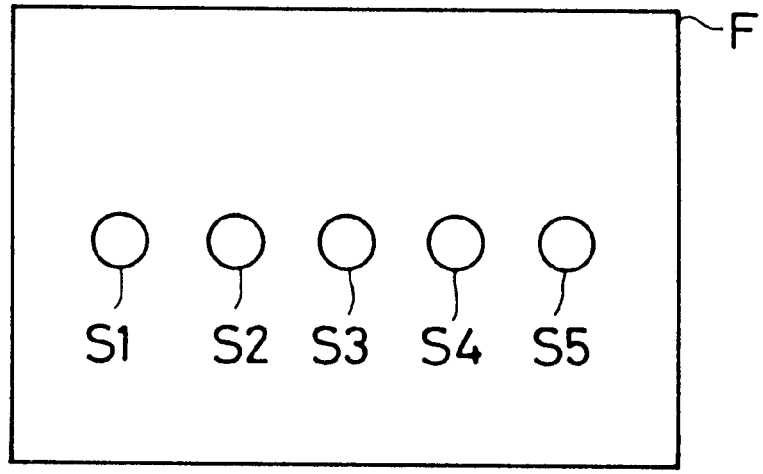
FIGS. 25A and 25B are views showing view fields, respectively.
Figure 25B:
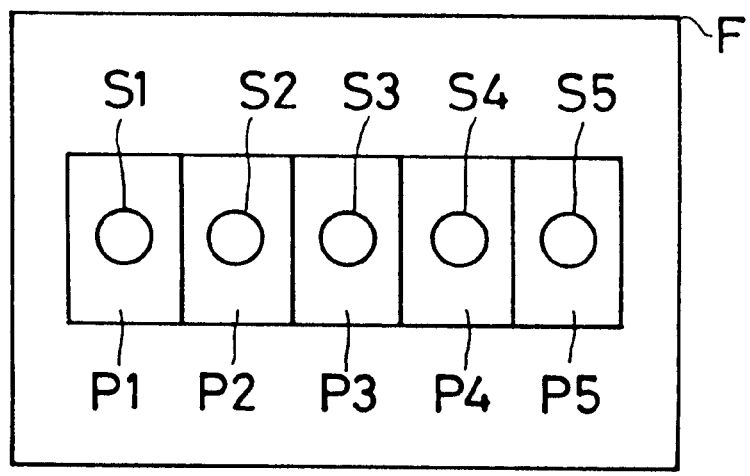

FIGS. 25A and 25B show an example of distribution of photometric sensitivity in the picture field on the exposure controlling photometric device of the camera. In FIG. 25A, five local photometric points $S_1$–$S_2$ are arranged in the picture field. The camera constructed in such a manner that one of the five photometric points is selected by detecting the direction of the visual axis, and the exposure is controlled on the basis of the photometric output of the selected photometric point can be provided. FIG. 25B shows an example that wider photometric areas $P_1$–$P_2$ are further arranged around the corresponding local photometric points. In this example, for example, when the point $S_2$ is designated in the direction of the visual axis, an amount V is calculated, in consideration of the photometric informations regarding the adjacent photometric points and areas, from the following equation:

$$V = S_2 + \frac{1}{2} \times P_1 + \frac{1}{4} \times (S_1 + P_1 + S_3 + P_3)$$

Thus, it is possible to obtain the photometric sensitivity feature having extension around the gazing point.

Further, it is possible to construct the camera of the present invention as the input means for inputting the necessary information to perform all of the functions of the camera, such as designation of the shutter speed, designation of the value of the aperture, power focus, operation of power zoom, multi-exposure control, change of various operating modes and the like.

In addition, the present invention can preferably be applied to a various camera having a finder, such as a video camera, steel video camera and the like, other than a silver salt camera. Particularly, it is extremely effective to apply the present invention to the video camera which often takes a moving object.

Figure 26A:
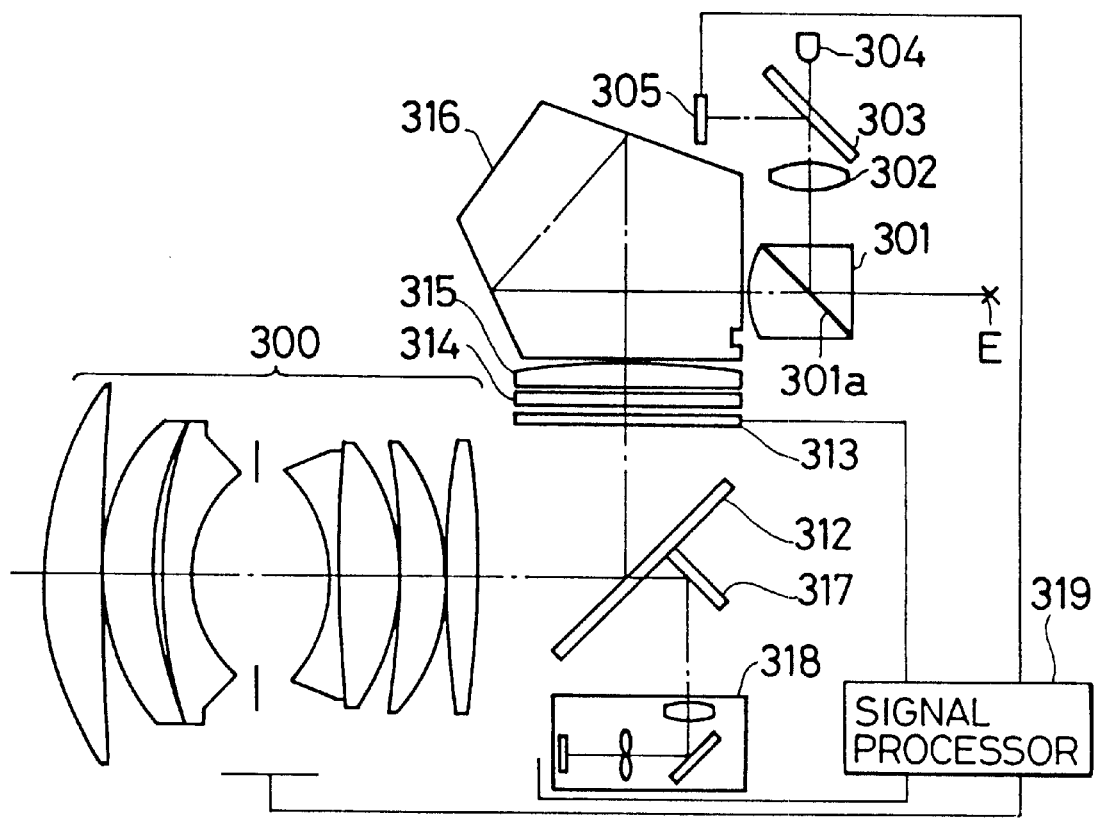
FIG. 26A is a constructural view of an optical system showing a further embodiment of the present invention.
Figure 26B:
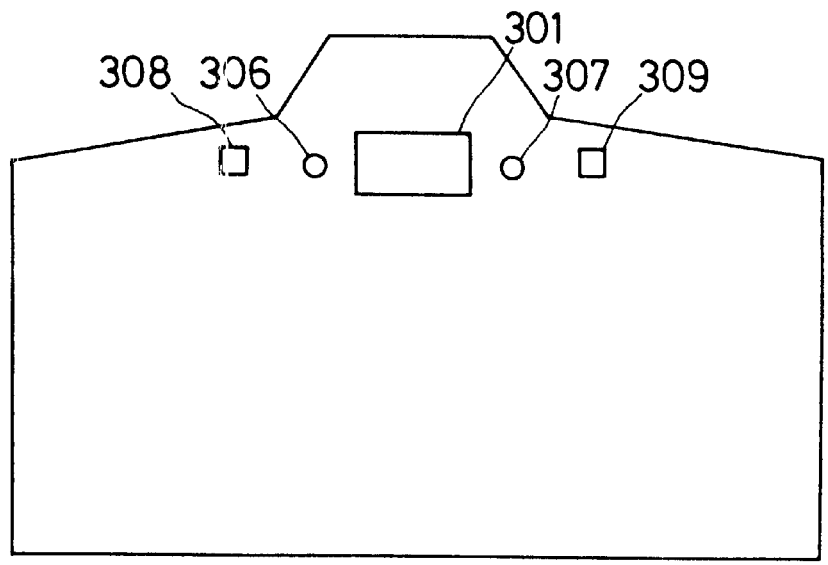
FIG. 26B is a back view of a camera body.
Figure 27:
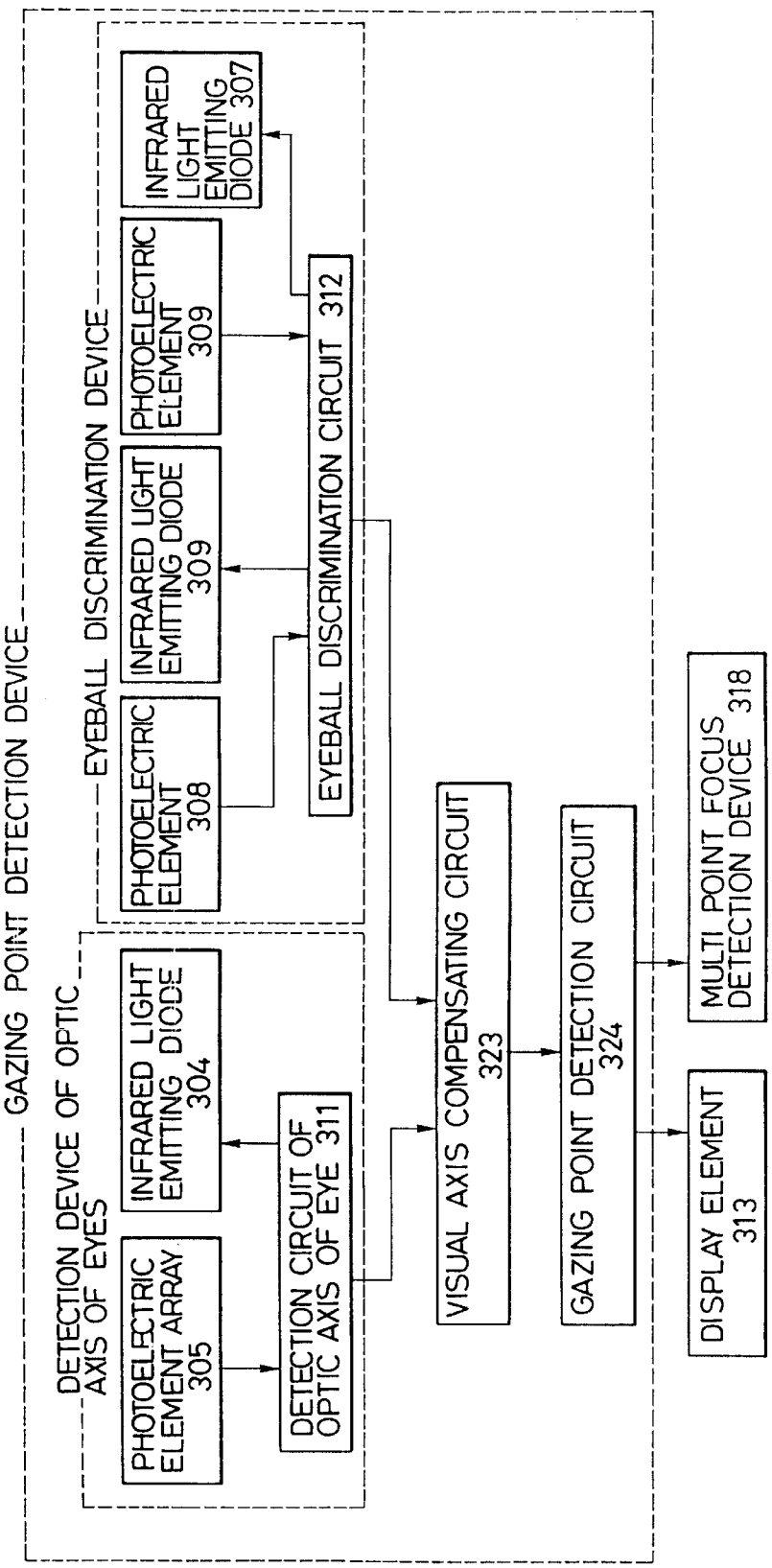
FIG. 27 is a block diagram showing a main construction of the embodiment of FIGS. 26A and 26B.

Next, a further embodiment for determining whether the left eye is used or the right eye is used will be explained with reference to FIGS. 26 and 27. Elements 301 to 305 constitute a detection device of an optic axis of the eye. Here, the element 301 is an eyepiece including a dichroic mirror 301a arranged obliquely therein. The mirror 301a acts as a light divider which can pass the visual light and reflect the infrared light. The element 302 is a positive lens and the element 303 is a half-mirror. The element 304 is an infrared luminous diode as an illumination source, and the element 395 is an array of photoelectric elements. The half mirror 303 divides the light path into two branched light paths, and the luminous diode 304 is arranged in one of the branched paths, whereas the array 305 of photoelectric elements is arranged in the other branched path. As the array 305 of photoelectric elements, the device having a plurality of photoelectric elements linearly arranged side by side in a direction perpendicular to the plane of FIG. 26A is normally used; however, the device having a plurality of photoelectric elements arranged in two orthogonal directions.

The luminous diode 304 is arranged at a focus position of the positive lens 302 so that the parallel light beams illuminate the operator's eye. Further, as an example, the array 305 of photoelectric elements is arranged with respect to the positive lens 302 in such a manner that the array has a conjugate relation to the vicinity of pupil of the eye at a predetermined position.

Incidentally, the reference numeral 300 designates a taking lens, 312 designates a quick return (QR) mirror, 313 designates a display element, 314 designates a focusing plate, 315 designates a condenser lens, 316 designates a pentagonal roof prism, 317 designates a sub-mirror, and 318 designates a multi-point focus detection device.

The object light beams passed through the taking lens 300 are partly reflected by the QR mirror 312 and are focused in the vicinity of the focusing plate 314. The diffuse light diffused by a diffusing surface of the focusing plate 314 is introduced into an eye point through the condenser lens 315, pentagonal roof prism 316 and eyepiece 1. Here, the display element 313 comprises, for example, two-layer guest-host type liquid crystal element having no polarization plate to display the distance measuring area (focus detecting position) in the finder view field.

The object light passed through the taking lens 300 partly passes through the QR mirror 312 and is reflected by the sub-mirror 317 to be introduced into the multi-point focus detection device 318 arranged on the bottom of the camera body. Further, the taking lens 300 is extended or retracted by a taking lens driving device (not shown) on the basis of the focus detecting information of the position selected by the multi-point focus detection device 318, thus performing the focus adjusting operation.

The visual axis detection device according to the present invention includes a detection circuit of optical axis of the eye which constitutes a part of a signal processing circuit 319, as well as the positive lens 302, half-mirror 303, luminous diode 304 and photoelectric element array 305. This detection circuit is executed by a software of the microcomputer. The infrared light emitted from the infrared luminous diode 304 arranged at a position of the focal length of the lens 302 passes through the half-mirror 303 and then is changed to parallel light beams by means of the lens 302. The infrared parallel light introduced into the eyepiece 301 from the above is reflected by the dichroic mirror 301a to illuminate the operator's eye positioned in the vicinity of the eye point.

The infrared light introduced into the eye is partly reflected by the first surface of the cornea, the reflected light is introduced into the eyepiece 301 again and is reflected by the dichroic mirror 301a and is converged by the lens 302, and then is reflected by the half-mirror 303 to form a projected image of the first Purkinje image (virtual image of the luminous diode 304) on the photoelectric element array 305. The infrared light introduced into the eye and passed through the cornea is partly reflected by the second surface of the lens, which reflected light is once focused in the lens to form the fourth Purkinje image (real image of the luminous diode 304) and then passes through the cornea and is introduced into the eyepiece 301. Subsequently, the infrared light is reflected by the dichroic mirror 301a and is converged by the lens 302, and then is reflected by the half-mirror 303 to form an image on the photoelectric element array 305. Now, since the centers of the curvature of the first surface of the cornea and of the second surface of the lens do not coincide with the center of the rotation of the eyeball, respectively, when the eyeball is rotated, the first and fourth Purkinje images projected onto the photoelectric element array 305 are formed at different positions. In this case, since the distance between these two images is a function of an angle of rotation of the visual axis (optical axis) of the eye, the angle of rotation of the visual axis of the eye can be detected at the detection circuit 319 of optical axis of the eye, on the basis of the position of the Purkinje images on the photoelectric element array 305. FIG. 26B shows a back of the single lens reflex camera, and FIG. 27 shows a block diagram of the visual axis detection device according to the present embodiment.

In FIG. 26B, the reference numeral 301 designates the eyepiece, 306 and 307 designate infrared luminous diodes, and 308 and 309 designate photoelectric elements.

An eyeball discrimination device is constituted by the infrared luminous diodes 306, 307, the photoelectric elements 308, 309 cooperating with these diodes, and an eyeball discrimination circuit 312 for forming a part of the signal processing circuit. The eyeball discrimination device is operated only when a power switch of the camera is energized, or in the initiation of operation of the gazing point detection device. Now, if it is assumed that the operator looks in at the eyepiece 301 with his right eye and triggers the gazing point detection device, the infrared light beams are emitted from the infrared luminous diodes 306 and 307 arranged on both left and right sides of the eyepiece 301. For example, the infrared light emitted from the luminous diode 306 is reflected by the face (near the nose) of the operator and is introduced into the corresponding photoelectric element 308. On the other hand, in this case, since there is no operator's face in front of the luminous diode 307, the infrared light does not introduced into the photoelectric element 309. The photoelectric elements 308 and 309 are designed to be sensitive to only the infrared light, and accordingly, do not influenced upon other external light. In the eyeball discrimination circuit 312, the output of the photoelectric element 308 is compared with that of the photoelectric element 308 to discriminate that the eye (right eye in this example) corresponding to the photoelectric element (photoelectric element 307 in this example) having the smaller output is the active eye (i.e., eye now being used). This circuit 312 sends this discrimination information to a visual axis correction or compensating circuit 323.

In the visual axis compensating circuit 323, the visual axis (viewing line) of the eyeball is compensated, on the basis of the information regarding the optic axis of the eye detected by the detection device of optic axis of eye and the eyeball discrimination information judged at the eyeball discrimination device. That is to say, if the angle of rotation of the optic axis is $\theta_0$, an angular deviation between the optic axis and the visual axis is $\theta\delta$ (for example, 6°), and the eyeball discrimination information is $\underline{k}$ (for example, if a clockwise direction is positive, in the right eye k=1, in the left eye k=0), the visual axis $\theta$ of the eyeball is compensated by the following equation:

$$\theta = \theta_0 + (-1)^k \cdot \theta\delta \quad (4)$$

Further, in a gazing point detection circuit 324, the gazing point is calculated on the basis of an optical constant of the finder optical system, the visual axis of the eyeball, and an amount of parallel displacement of the eyeball with respect to the optical axis of the eyeball optic axis detection optical system, detected by the detection device 311 of optic axis of eye. Here, if the gazing point in the finder field is previously limited, memory means are provided for providing the relation between the gazing point, and the visual axis of the eyeball, the optical axis and the amount of parallel displacement; when the visual axis of the eyeball, the optical axis and the amount of parallel displacement are detected or calculated, the gazing point corresponding to these detected or calculated informations is lead out from the memory means.

The gazing point information detected by the gazing point detection circuit 314 is, for example, sent to the display element 313 and to the multi-point focus detection device 318. In the display element 313, a position at which the operator gazes is displayed in the finder field to help the confirmation of the gazing point.

On the other hand, in the multi-point focus detection device 318, a focus of a point at which the operator gazes is detected, and a focus adjustment with respect to the gazing object is effected.

In the illustrated embodiment, while an example that the gazing point detection device is used as the input means for the multi-point focus detection device 318 was explained, the gazing point detection device can be used as photometric point inputting means for a multi-point photometric device, or as taking modes (program mode, shutter speed preference mode, stop preference mode and the like) changing means.

Further, in the illustrated embodiment, while an example that the eyeball is discriminated by the eyeball discrimination device comprising the infrared luminous diodes and the photoelectric elements was explained, the eyeball discrimination may be effected by the use of a wave transmitting element of the piezo-electric body.

Figure 28:
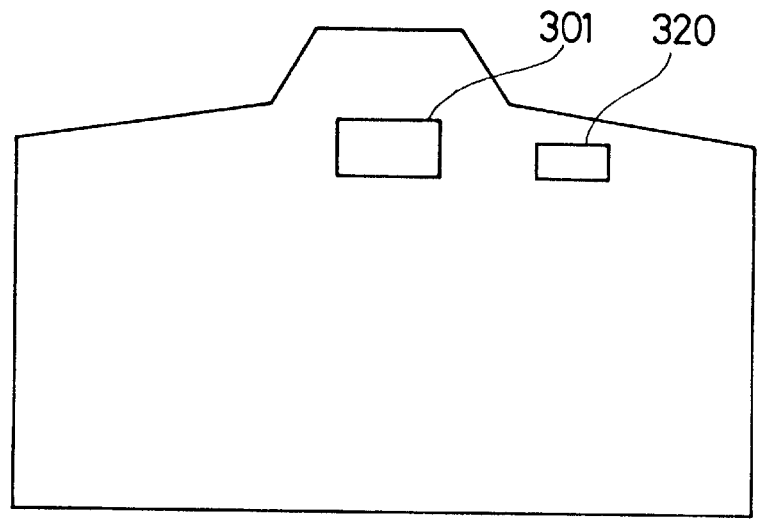
FIG. 28 is a back view of a camera body according to a further embodiment of the present invention.
Figure 29:
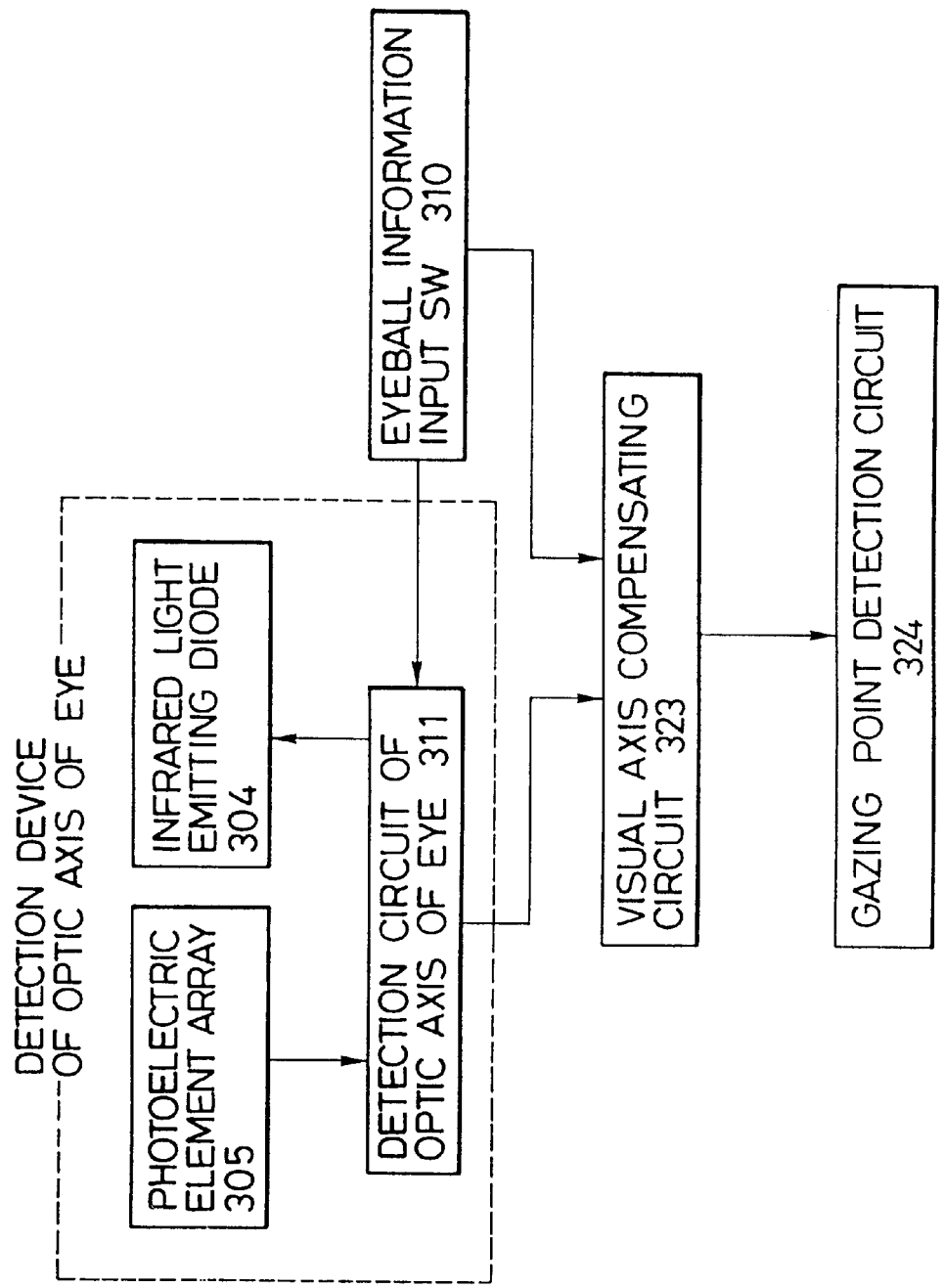
FIG. 29 is a block diagram showing a main construction of the embodiment of FIG. 28.

FIGS. 28 and 29 show the other embodiment of the present invention, where FIG. 28 shows a back of the single lens reflex camera, and FIG. 29 shows a block diagram of a gazing point detection device.

In this embodiment, the reference numeral 301 designates an eyepiece, and 310 designates an eyeball information input switch. The eyeball information input switch 310 is arranged on the back of the single lens reflex camera aside the eyepiece.

The eyeball information input switch 310 is designed to take the following three states: That is to say, (1) OFF-state: do not energize the gazing point detection device;

(2) ON-state: energize the gazing point detection device while looking in at the finder with right eye; or (3) ON-state: energize the gazing point detection device while looking in at the finder with left eye.

When the operator sets the eyeball information input switch 310 to the ON-state in the above (2) or (3) (the gazing point detection device is energized), the signal from this switch is sent to a detection circuit 311 of optic axis of eye. In the detection circuit 311 of optic axis of eye, in response to said signal, the infrared light is emitted from the infrared luminous diode 304 toward the operator's eyeball, and the angle $\theta_0$ of rotation of the optic axis of the eye, and the amount of parallel displacement of the eyeball with respect to the optical axis of the eyeball optic axis detection optical system are detected on the basis of the positions of the first and fourth Purkinje images projected on the photoelectric element array 305.

In the visual axis compensating circuit 323, the visual axis of the eyeball is compensated in accordance with the above equation (4) on the basis of the eyeball optic axis information $\theta_0$ detected by the detection device of optic axis of eye, and the eyeball information $\underline{k}$ inputted at the eyeball information input switch 310.

Further, in the gazing point detection circuit, the gazing point is calculated on the basis of the optical constant of the finder optical system, the visual axis of the eyeball, and the amount of parallel displacement of the eyeball.

On the other hand, when the eyeball information input switch 310 is set to the OFF-state in the above (1) (the gazing point detection device is not energized), since the gazing point detection is not executed, the operation mode (for example, taking mode, multi-point focus detection mode, multi-point photometric mode and the like) of the camera is fixed to the previous mode or the reference mode. Alternatively, when the above OFF-state as mentioned in (1) is set, the camera may be set to a manual operation mode input condition.

Figure 31:
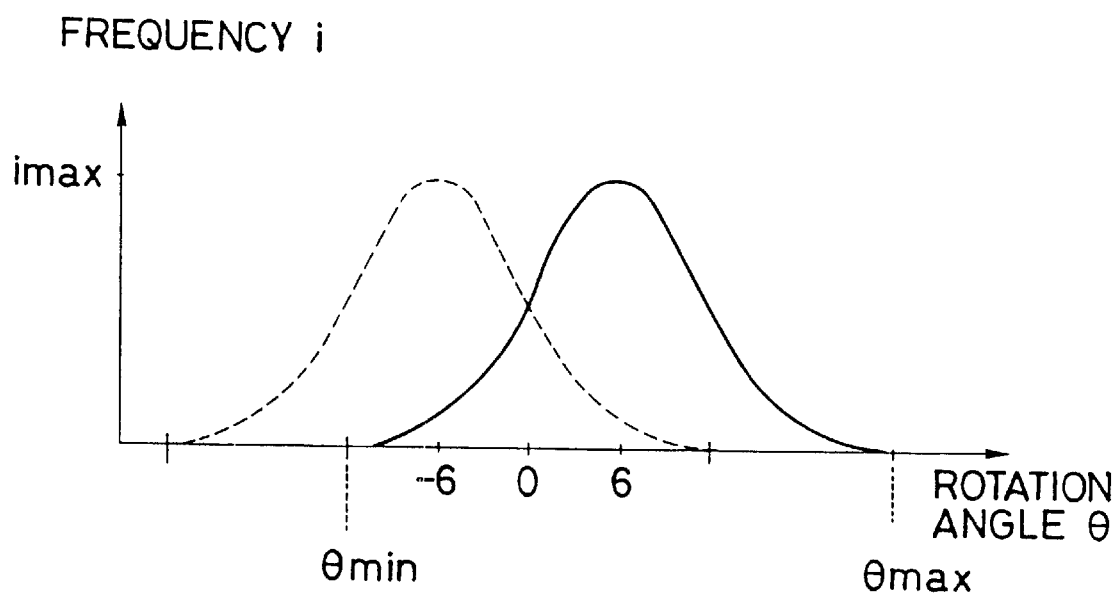
FIG. 31 is a graph for explaining the embodiment of FIG. 30.
Figure 30:
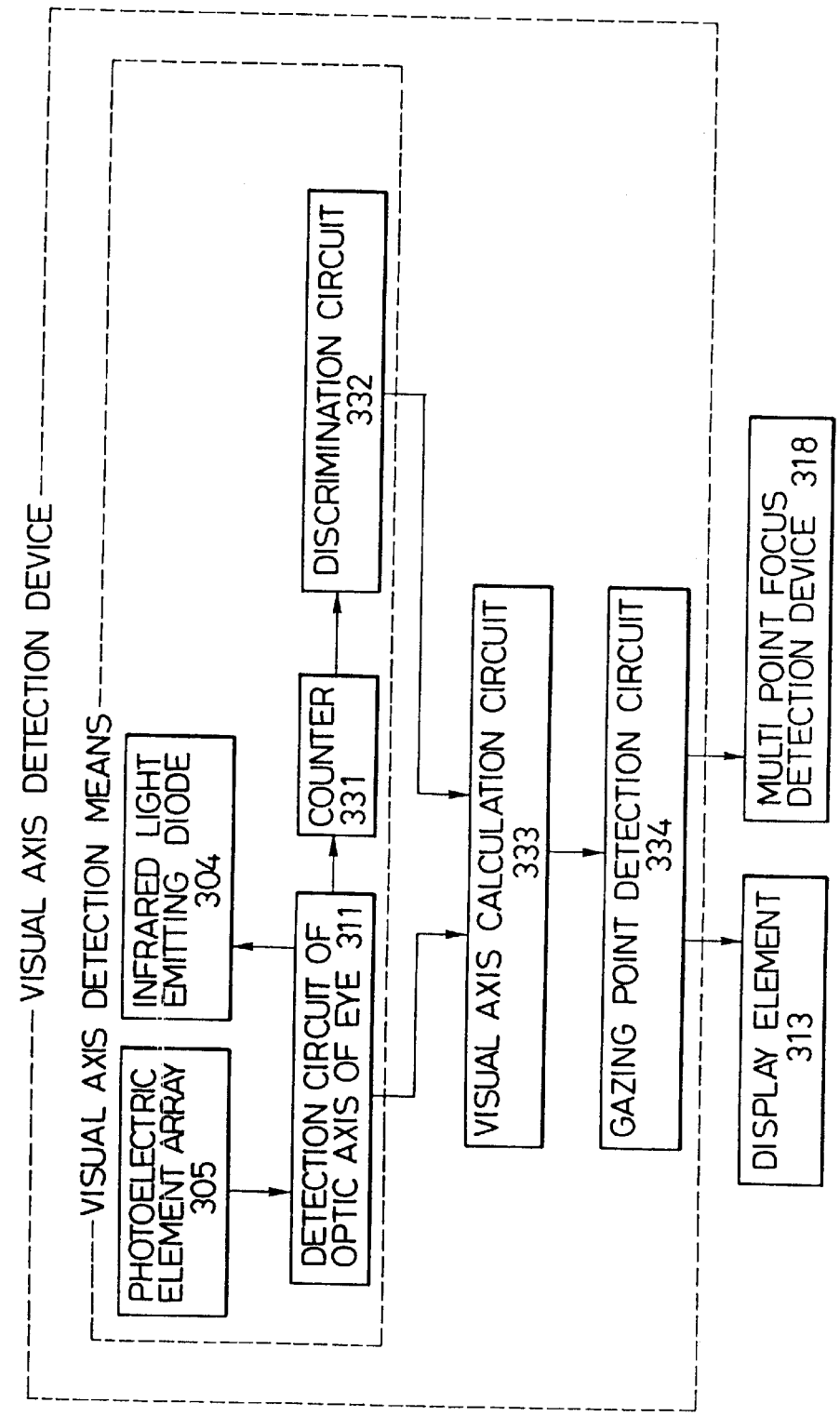
FIG. 30 is a block diagram showing a main construction of a further embodiment of the present invention.
Figure 32:
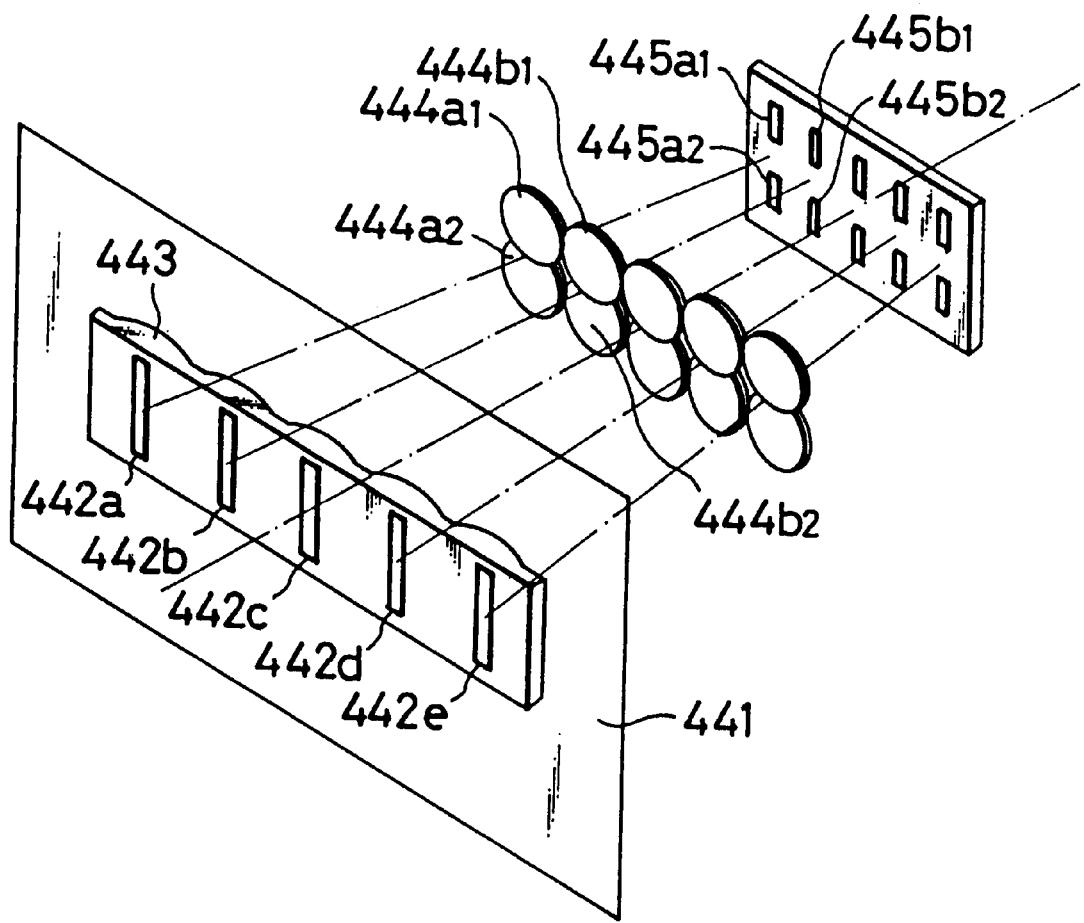
FIG. 32 is a perspective view showing a conventional focus detecting device.

FIG. 30 shows an alternation of the block diagram which utilizes the construction shown in FIG. 26A. In FIG. 30, the detection circuit 311 of optic axis of eye is operated upon energization of the power switch of the camera, or when a visual axis detection start switch (not shown) provided independently from the power switch is set to an ON-state. The detection circuit 311 of optic axis of eye can continuously read in the image signals formed on the photoelectric element array 305 on the basis of the reflected light beams emitted from the eyeball (among the light beams from the infrared luminous diode 304), and at the same time detect the angle of rotation of the optic axis of the eyeball. Such operations are repeated for a predetermined cycles in the beginning of the visual axis detection operation, and the detected rotation angle of the optic axis of the eyeball is counted by a counter circuit 331 forming a part of the signal processing circuit 319. Incidentally, in FIG. 29, the elements 304, 305, 310, 311 and 312 form a part of the view axis detection means. FIG. 31 shows a distribution of frequency of rotation angle of optic axis detected when the detection circuit 311 of optic axis of eye is operated for plural times. A solid line designates the case where the right eye of the operator is used, and a broken line designates the case where the left eye (the rotation in a clockwise direction is regarded as positive). In general, since the operator tries to position the main object in the center of the taking picture, the frequency that the operator gazes the center of the picture field will be increased. Consequently, the detected distribution of the rotation angle of the optic axis of the eyeball is offset in the plus side or a minus side with respect to the position of angle 0°, according to the used eye (right or left). Thus, in the illustrated embodiment, the nation circuit 312 detects the rotation angle having the highest frequency ($\iota$ max), and, by judging whether $\iota$ max is in the plus side or minus side, discriminate whether the right eye is used or the left eye is used.

Then, the visual axis of the operator is calculated and compensated by the visual axis calculation circuit 333 on the basis of the output signal from the detection circuit 311 of optix axis of eye and the output signal from the discrimination circuit 312. In this case, the visual axis $\theta$ of the eyeball can be obtained from the above equation (4).

Incidentally, in the illustrated embodiment, the discrimination circuit 312 discriminates whether the right eye is used or the left eye is used, by judging whether the rotation angle having the highest frequency is in the plus side or minus side; however, if the optical constant of the finder optical system is predetermined, the range within which the optic axis of the eyeball can rotate is limited. For this reason, by comparing the above rotation permissible range with a maximum value $\theta$ max and a minimum value $\theta$ min of the rotation angle of the optic axis of the eyeball counted by the counter circuit 331, it is possible to discriminate whether the right eye is used or the left eye is used.

Further, the angular deviation $\theta\delta$ between the optic axis of the eyeball and the visual axis can be obtained by an absolute value of the rotation angle having the highest frequency among the rotation angles counted by the counter circuit 331.

As mentioned above, according to the present invention, it is possible to control the auto focus adjustment, auto exposure adjustment and other camera operations at the operator's will, by illuminating the operator's eye with, for example, the infrared light, by detecting the movement of the position of the reflected image, and by determining the direction of the visual axis. The present invention provides an improved camera which can meet the requirements for the automatic functions such as operability, accuracy and speed, and the freedom of framing for the manual control. In the embodiment of the present invention, an optical visual axis detection method performed in the finder optical system, for detecting the visual axis with high accuracy, while giving the freedom of the positional relation between the camera and the operator was described.

Further, a construction of the camera in which the visual axis detection device can be incorporated into the camera and which does not affect a bad influence upon the portable feature and is relatively chap was disclosed, and a new controlling method of the camera was also described. With the present invention, it is possible for the operator to control the high technique automatic functions correctly at his will.

We claim:

1. An optical device comprising:

an inspection system for inspecting an object;

detection means for optically detecting a direction of an optic axis of an operator's eyeball in which the operator looks in at said inspection system;

discrimination means for discriminating whether said eyeball is a right eye or a left eye; and compensating means for compensating the direction of said optic axis detected by said detection means on the basis of information from said discrimination means and for forming information regarding a direction of a visual axis of said eyeball.

2. An optical device according to claim 1, wherein said optical device is a camera, and said inspection system comprises a finder of said camera.

3. An optical device comprising:

an inspection system for inspecting an object;

detection means for optically detecting a direction of an optic axis of an operator's eyeball in which the operator looks in at said inspection system;

discrimination means for discriminating whether an operator's eye looking in at said inspection system is a right eye or a left eye; and calculation means for calculating a direction of a visual axis of the operator's eye, on the basis of an output signal from said discrimination means and an output signal from said detection means.

4. An optical device according to claim 3, wherein said discrimination means statistically discriminate whether the operator's eye looking in at said inspection system is a right eye or a left eye, on the basis of the result of a plurality of detections time-serially performed by said detection means.

5. An optical device comprising:

an observation system for observing a scene;

detection means for optically detecting an optical axis of an operator's eye looking into said observation system;

compensating means, comprising a memory, for compensating for an output of said detection means by a storing in said memory the difference between the direction of said optical axis and the direction of a gazing point of the operator's eye, and for outputting information regarding the direction of the gazing point;

input means for manually inputting data on said difference; and control means for controlling said optical device on the basis of an output of said compensating means.

6. A camera or a camera body, comprising:

a viewer for observing a scene;

first detection means for detecting a direction of the eye of an observer observing the scene through the viewer;

second detection means for detecting rotation of said camera or camera body; and means for correcting a result of detection of said first detection means and for providing an output for indicating a corrected direction corresponding to the direction of the observer's eye.

7. A camera or a camera body according to claim 6, wherein said second detection means detects the direction and amount of the rotation of said camera or said camera body on the basis of an imaging signal obtained by imaging an object.

8. A camera or a camera body according to claim 6, wherein said second detection means detects the direction and amount of the rotation of said camera or said camera body on the basis of an inclination angle of a pendulum.

9. A camera or a camera body according to claim 6, wherein said second detection means includes a mercury switch which outputs the direction and amount of the rotation of said camera or said camera body.

10. A camera or a camera body according to claim 6, wherein said first detection means includes irradiation means for irradiating the observer's eye and two-dimensional photoelectric conversion elements for receiving light reflected by the observer's eye.

11. An apparatus comprising:

a finder having a pentagonal prism and an eyepiece lens;

means for illuminating an eye with light;

a detection optical system for detecting light from an eye through the eyepiece lens;

detection means for detecting an intensity distribution of the light from the eye through said detection optical system; and gazing direction detecting means for detecting a gazing direction of the eye by using an output of said detection means, wherein said gazing direction detecting means detects a direction of an optical axis of the eye based upon the output of said detecting means, wherein said gazing direction detecting means detects the gazing direction of the eye based on the detected direction of the optical axis of the eye and correction data, and wherein said finder and said detection optical system have a common optical axis, and said illuminating means and said detection optical system are provided at the eyepiece side of said pentagonal prism.

12. An apparatus according to claim 11, further comprising:

display means for displaying a gazing object in the view field in said finder, wherein said gazing direction detecting means detects the difference between the direction of the optical axis of the eye viewing the gazing object obtained based on the output of said detecting means and the gazing direction of the eye corresponding to the gazing object, so that said correction data for performing correction of the deviation based on the difference is determined.

13. An apparatus according to claim 12, wherein said display means displays a gazing point mark at a position corresponding to the direction of the optical axis of the eye in the view field.

14. An apparatus according to claim 13, wherein said gazing direction detecting means includes adjusting means for adjusting the correction value so that the gazing point mark overlaps the gazing object.

15. An apparatus according to claim 12, wherein said gazing direction detecting means includes an EEPROM for storing the correction value.

16. An apparatus according to claim 12, wherein a gazing object is displayed so that the gazing object overlaps an image formed in the view field.

17. An apparatus according to claim 12, further comprising:

focusing state detecting means for detecting a focusing state of an objective lens for forming an image of an object, wherein a mark for indicating a portion of the object for adjusting the focusing state for the object is used as the gazing object.

18. An apparatus according to claim 11, wherein said detecting means receives light from the eye through said eyepiece lens of said finder.

19. An apparatus according to claim 18, wherein said detecting means receives light from the eye via a dichroic mirror.

20. An apparatus according to claim 18 further comprising:

illuminating means for illuminating the eye with infrared light.

21. An apparatus according to claim 11, wherein said optical apparatus is a camera.

22. An optical apparatus according to claim 11, wherein said optical apparatus is capable of changing its posture and further comprises:

posture detecting means for detecting the posture of said optical apparatus; and means for detecting the viewing direction of the eye based on the outputs of said intensity distribution detecting means and said posture detecting means.

23. An apparatus according to claim 22, wherein said optical apparatus is a camera.

24. An optical apparatus according to claim 11, wherein said optical apparatus is capable of changing its posture said optical apparatus further comprising:

means for controlling said gazing direction detecting means according to the posture of said optical apparatus.

25. An apparatus according to claim 24, wherein said optical apparatus is a camera.

26. An apparatus comprising:

a finder having a pentagonal prism and an eyepiece lens;

means for illuminating an eye with light;

a detection optical system for detecting light from the eye through the eyepiece lens;

detection means for detecting an intensity distribution of light from the eye through said detection optical system, wherein said finder and said detection optical system have a common optical axis, and said illuminating means and said detection optical system are provided at the eyepiece side of said pentagonal prism, gazing direction detecting means for detecting a gazing direction of the eye by using an output of said detection means, wherein said gazing direction detecting means detects a direction of an optical axis of the eye based upon the output of said detecting means, and wherein said gazing direction detecting means detects the gazing direction of the eye based on the detected direction of the detected optical axis of the eye and correction data;

display means for displaying a gazing object in the view field in said finder, wherein the difference between the direction of the optical axis of the eye when viewing the gazing object obtained based on the output of said detecting means and the gazing direction corresponding to a position of the gazing object is detected and said correction data is determined based on the detected difference, focusing state detecting means for detecting a focusing state of an objective lens for forming an image of an object, wherein a plurality of marks indicating a plurality of mutually different portions of the object are formed in said view field and a mark of said plurality of marks is used as the gazing object, and wherein when said gazing direction detecting means detect a state where the eye gazes at a mark among the plurality of marks, focusing is performed for a portion of the object corresponding to the mark at which the eye gazes by using said focusing state detecting means.

27. An apparatus comprising:

a finder having a pentagonal prism and an eyepiece lens;

focusing state detecting means for detecting a focusing state of an objective lens for forming an image of an object;

gazing direction detecting means for detecting a gazing directiom of an eye, wherein said gazing direction detecting means comprises means for detecting the direction of an optical axis of the eye, wherein said optical axis direction detecting means including means for illuminating the eye with light, a detecting optical system for detecting light from the eye through the eyepiece lens, and means for detecting an intensity distribution of the light from the eye through the detection optical system, wherein said illuminating means and said detection optical system are provided at the eyepiece side of said pentagonal prism, wherein said gazing direction detecting means performs correction of a deviation between the gazing direction of the eye and the direction of the optical axis of the eye to detect the gazing direction of the eye, wherein a mark indicating a portion of the object used for detecting the focusing state is used as a gazing object for detecting the deviation between the gazing direction of the eye and the direction of the optical axis of the eye, wherein when said gazing direction detection means detects a state where the eye gazes at a mark among the plurality of marks, focusing state detecting is performed for a portion of the object corresponding to the mark at which the eye gazes, and wherein correction data are formed based on the deviation between the gazing direction corresponding to a position of the mark as the object and the direction of the optical axis of the eye when gazing at the mark as the object, said correction data being used to correct the deviation.

28. An apparatus according to claim 27, wherein said apparatus is a camera.

29. An apparatus comprising:

a pentagonal prism;

an eyepiece lens;

means for illuminating an eye with light;

a detection optical system for receiving light from the eye through the eyepiece lens and for forming an image of the eye;

an image pick-up element for receiving the image of the eye;

means for calculating a direction of an optical axis of the eye based on an output of said image pick-up element;

determining means for determining a gazing direction of the eye based on the calculated direction of the optical axis and correction data, wherein the correction data includes information relating to a deviation between the direction of the optical axis of the eye and the gazing direction of the eye;

a plurality of marks provided to a plurality of mutually different portions in a view field;

means for performing an auto-focus operation of an objective lens according to an output of said determining means, said means for performing the auto-focus operation performing the autofocus operation for the portion in the view field corresponding to the mark positioned in the determined gazing direction of the eye among the plurality of marks; and means for forming the correction data by using said detecting means and a mark among the plurality of marks, wherein said illuminating means and said detection optical system are provided at the eyepiece side of said pentagonal prism.

30. An apparatus according to claim 29, wherein said apparatus is a portable apparatus.

* * * * *

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

Title page:

Item [30], Foreign Application Priority , Data:
"Apr. 26, 1989" should read --Apr. 26, 1988--.

Item [57], IN THE ABSTRACT:

Line 1, "comprising:" should read --includes a-- and "means" should be deleted.
Line 2, "illumination means" should read --an illuminator--.
Line 5, "photoelectric" should read --a photoelectric-- and "means" should be deleted.
Line 6, "calculation means" should read --a calculator--.
Line 8, "means" should be deleted.
Line 9, "condition setting means" should read --a condition setter--.
Line 10, "calculation means," should read --calculator-- and "taking" should read -photographing--.

Title page:

ON SHEET 5 OF THE DRAWINGS:

In Figure 7, "FORTH IMAGE" should read --FOURTH IMAGE--.

COLUMN 1:
Line 17, "compensate" should read --compensate for--.
Line 24, "promoted in accordance with" should read --improved due to the--.
Line 25, "cost-down" should read --decreased cost--.
Line 26, "CCD." should read --a CCD.--.

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

Column 1 (continued):
Line 31, "remarkable" should read --a remarkable--.
Line 32, "have a" should read --have the--.
Line 33, "merits" should read --merit--.
Line 34, "high" should read --good--.
Line 39, "camera," should read --camera-- and "the fundamental improvement in the cameras hav-" should be deleted.
Line 40, "ing such automatic functions has been requested." should be deleted.

COLUMN 2:

Line 2, "called as" should read --known as--.
Line 6, "is the" should read --is--.
Line 9, "said" should read --the--.
Line 16, "adequately:" should read --adequately.--.
Line 22, "the most" should read --most--.
Line 23, "well" should read --easily-- and "camera" should read --a camera--.
Line 24, "need the" should read --needs such a--.
Line 25, "taken" should read --photographed--.

UNITED STATES PATENT AND TRADEMARK OFFICE
CERTIFICATE OF CORRECTION

PATENT NO.    : 6,014,524
DATED         : January 11, 2001
INVENTOR(S)   : Kenji Suzuki et al.

It is certified that error appears in the above-identified patent and that said Letters Patent is hereby corrected as shown below:

Column 2 (continued):
Line 31, "also" should be deleted.
Line 32, "of" should read --with respect to--.
Line 33, "the high" should read --great-- and "requested" should read --required--
Line 38, "shutter" should read --opportunity to close the shutter--.
Line 39, "chance only" should be deleted and "in" should read --only for--.
Line 55, "said" should read --the--.
Line 57, "comprise" should read --comprised of--.
Line 61, "a software" should read --software--.

COLUMN 3:

Line 6, "a integrally" should read --an integrally--.
Line 12, "herein-after)" should read --hereinafter)--.
Line 38, "among from" should read --from among--.
Line 42, "available" should read --viable--.
Line 46, "or facilitation" should read --and speed--.
Line 53, "taking" should read --photographing--.
Line 54, "pripot" should read --tripod--.
Line 61, "focus to" should read --focuses on--.
Line 64, "has reliability" should read --is reliable--.

UNITED STATES PATENT AND TRADEMARK OFFICE
CERTIFICATE OF CORRECTION

PATENT NO.  : 6,014,524
DATED       : January 11, 2001
INVENTOR(S) : Kenji Suzuki et al.

It is certified that error appears in the above-identified patent and that said Letters Patent is hereby corrected as shown below:

COLUMN 4:

Line 4, "as the" should read --as a--.
Line 5, "Purkinge" should read --Purkinje--.
Line 9, "Purkinge" should read --Purkinje--.
Line 12, "curved" should read --the curved--.
Line 16, "eye." should read --the eye.--.
Line 17, "gazes a" should read --gazes at a--.
Line 22, "and the" should read --and--.
Line 24, "fear of should read --risk of--.
Line 30, "recent" should read --recently developed--.
Line 36, "method" of should read --method for manipulating--.
Line 40, "that" should be deleted.
Line 41, "can" should read --to-- and "devices" should read --device--.
Line 43, "operation" should be deleted.
Line 46, "correct" should read --correct for--.
Line 49, "from" should read --between--.
Line 51, "The other" should read --Another--.
Line 60, "said" should read --a--.
Line 61, "member;" should read --member of the present invention;--.
Line 62, "explaining" should read --explaining the structure of--.

COLUMN 5:

Line 7, "explaining" should read --explaining the-- and "dimentional" should read -dimensional--.
Line 9, "in a" should read --in the--.
Line 10, "poisture" should read --posture--.
Line 56, "independently," should read --independently in a camera-- and "than the" should read --than a--.
Line 58, "for the" should read --for--.
Line 62, "and a" should read --and an--.
Line 65, "exposure" should read --expose--.

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

COLUMN 6:

Line 19, "maks" should read --mask--.
Line 24, "sub-stantially" should read --substantially--.
Line 26, "informations" should read --information--.
Line 27, "are" should read --is--.
Line 28, "co-relation" should read --correlation--.
Line 34, "having" (first occurrence) should be deleted.
Line 36, "informations" should read --information--.
Line 37, "are" should read --is-- and "co-relation" should
read --correlation--.
Line 46, "or" should be deleted and "provides" should read --provide--.

COLUMN 7:

Line 7, "oeprator's" should read --operator's--.
Line 24, "2B" should read --2B.--.
Line 36, "assemblys" should read --assembly--.
Line 42, "example" should read --example of--.
Line 44, "hte" should read --the--.
Line 58, "in a" should read --to a--.

COLUMN 8:

Line 12, "vairous" should read --various--.
Line 22, "at" should be deleted.
Line 24, "as" (first occurrence) should be deleted.
Line 29, "rearwardly" should read --rearward--.
Line 49, "sent" should read --send--.
Line 62, "contribute" should read --contribute to--.

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

COLUMN 9:

Line 9, "looking" should read --looked-- and "forwardly" should read --forward--.
Line 25, "looking" should read --looked--.
Line 26, "forwardly" should read --forward--.
Line 39, "mentioend" should read --mentioned--.
Line 40, "the" (first occurrence) should read --a--.
Line 54, "conpensation" should read --compensation--.

COLUMN 10:

Line 10, "in order" should read --in the order-- and "most" should read --most--.
Line 17, "of amount" should read --of the amount--.
Line 21, "the visual" should read --a visual--.
Line 22, "does" should read --is-- and "upon" should read --by--.
Line 28, "method." should read --a method--.
Line 31, "than a" should read --than its-- and "more" should read --more,--.
Line 34, "Similar" should read --A similar--.
Line 35, "an cylindrical" should read --a cylindrical--.
Line 38, "receive" should read --receives--.

UNITED STATES PATENT AND TRADEMARK OFFICE
CERTIFICATE OF CORRECTION

PATENT NO.    : 6,014,524
DATED         : January 11, 2001
INVENTOR(S)   : Kenji Suzuki et al.

It is certified that error appears in the above-identified patent and that said Letters Patent is hereby corrected as shown below:

COLUMN 11:

Line 9, "Similar" should read --A similar--.
Line 13, "used" should read --use--.
Line 14, "high" should read --a highly--;
Line 31, "device" should read --device results,--.
Line 33, "can be obtained" should be deleted.
Line 35, "further" should read --additional--.
Line 62, "synchronous" should read --synchronism--

COLUMN 12:

Line 25, "almost" should read --most--.
Line 29, "of ±1°~2°." should read --of ±1°~2°.--.
Line 37, "gazing" should read --gazing at--.
Line 54, "such" should read --such an--.
Line 56, "gazing" should read --gazing at--.
Line 58, "seeked" should read --found--.
Line 61, "Expressing" should read --Expressed--.

UNITED STATES PATENT AND TRADEMARK OFFICE
CERTIFICATE OF CORRECTION

PATENT NO.    : 6,014,524
DATED         : January 11, 2001
INVENTOR(S)   : Kenji Suzuki et al.

It is certified that error appears in the above-identified patent and that said Letters Patent is hereby corrected as shown below:

COLUMN 13:

Line 2, "gazing" should read --gazing at--.
Line 5, "Furhter," should read --Further--.
Line 11, "is," should read --is one,--.
Line 12, "is the" should read --is a--.
Line 30, "gazes" should read --gazes at--.
Line 45, "that he" should read --in which he--.
Line 52, "mainpulating" should read --manipulating--.
Line 59, "do not" should read --does not--.
Line 60, "point" should read --pointed--.
Line 62, "directed, "should read --designed--

COLUMN 14:

Line 4, "perspons," should read --operators,--.
Line 34, "of' should be deleted and "comprising" should read --comprise--.

COLUMN 15:

Line 4, "gazes" should read --gazes at--.
Line 8, "gazes" should read --gazes at--.
Line 25, "in the most" should read --in most--.
Line 55, "revokable" should read --revolvable--.

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

COLUMN 16:

Line 19, "with" should read --while-- and "by" should read --in--.
Line 24, "CCD, MOS" should read --a CCD, a MOS--.
Line 30, "is in" should read --is of--.
Line 52, "beams is" should read --beams are--.
Line 58, "can" (first occurrence) should be deleted.
Line 59, "in a" should read --to a--.

COLUMN 17:

Line 3, "a original" should read --an original--.
Line 7, "loosing" should read --losing--.
Line 33, "passes" should read --pass--.
Line 38, "is" (both occurrences) should read --are--.
Line 44, "using" should read --use--.
Line 50, "eye" should read --eye.--.

COLUMN 18:

Line 8, "a angular" should read --an angular--.
Line 38, "gazes" should read --gazes at--.
Line 54, "more largely" should be deleted and "shifted" should read --shifted more--.
Line 55, "for" should read --due to--

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

COLUMN 19:

Line 39, "a various camera" should read --various cameras--.
Line 42, "takes" should read --photographs--.
Line 63, "arranged" should read --is arranged--.

COLUMN 21:

Line 27, "introduced" should read --get introduced--.
Line 30, "do" should read --are-- and "upon" should read --by--.
Line 40, "compensated," should read --compensated for,--

COLUMN 23:

Line 19, "cycles" should read --cycle--.
Line 30, "eye" should read --eye is used--.
Line 33, "gazes" should read --gazes at--.
Line 38, "nation" should read --discrimination--.
Line 41, "discriminate" should read --discriminates--.
Line 44, "compensated" should read --compensated for--.
Line 46, "optix" should read --optic--.

COLUMN 24:

Line 16, "affect a bad" should read --have an undesirable-- and "portable" should read -portability of the camera--.
Line 17, "feature" should be deleted and "chap" should read --inexpensive--.
Line 20, "high technique" should be deleted.

UNITED STATES PATENT AND TRADEMARK OFFICE
CERTIFICATE OF CORRECTION

PATENT NO. : 6,014,524
DATED : January 11, 2001
INVENTOR(S) : Kenji Suzuki et al.

It is certified that error appears in the above-identified patent and that said Letters Patent is hereby corrected as shown below:

COLUMN 26:

Line 44, "posture" should read --posture,--.

COLUMN 27:

Line 32, "object;" should read -object; a plurality of marks provided in a view field indicating different portions of the object;--.
Line 34, "directiom" should read --direction--.

Signed and Sealed this

Third Day of July, 2001

*Attest:*

*Attesting Officer*

NICHOLAS P. GODICI
*Acting Director of the United States Patent and Trademark Office*